United States Patent [19]

Shiono

[11] Patent Number: 5,317,551
[45] Date of Patent: May 31, 1994

[54] AN OPTICAL DISK HEAD INCLUDING A LIGHT PATH HAVING A THICKNESS AND WIDTH GREATER THAN THE LIGHT BEAM WAVELENGTH BY A PREDETERMINED AMOUNT

[75] Inventor: Teruhiro Shiono, Osaka, Japan

[73] Assignee: Matsushita Electric Industrial Co., Ltd., Osaka, Japan

[21] Appl. No.: 729,140

[22] Filed: Jul. 12, 1991

[30] Foreign Application Priority Data

Jul. 16, 1990 [JP] Japan .................. 2-189052
Jul. 16, 1990 [JP] Japan .................. 2-189053

[51] Int. Cl.⁵ ............................. G11B 7/00
[52] U.S. Cl. .................. 369/44.12; 369/112; 369/44.23; 369/103; 359/571
[58] Field of Search ............. 369/44.11, 112, 109, 369/103, 110, 111, 124, 44.12, 44.23, 100, 44.24, 122; 359/742, 571–575; 385/14, 129, 130, 131

[56] References Cited

U.S. PATENT DOCUMENTS

| | | | |
|---|---|---|---|
| 4,866,694 | 9/1989 | Korth | 369/110 |
| 4,966,446 | 10/1990 | Huang et al. | 359/572 |
| 4,966,447 | 10/1990 | Huang et al. | 359/572 |
| 5,070,488 | 12/1991 | Fukushima et al. | 369/44.12 |

FOREIGN PATENT DOCUMENTS

| | | |
|---|---|---|
| 0226647 | 1/1987 | European Pat. Off. |
| 0394865 | 10/1990 | European Pat. Off. |
| 3921406 | 4/1990 | Fed. Rep. of Germany |
| 62-146443 | 6/1987 | Japan ............... 369/44.12 |
| 110433 | 1/1989 | Japan ............... 369/103 |
| 2-301702 | 12/1990 | Japan |
| 2-301703 | 12/1990 | Japan |
| 2-301704 | 12/1990 | Japan |

OTHER PUBLICATIONS

Book, "Autofocus Hitec Technologies", edited by M. Kohno (with English translation), pp. 291–298 (undated).

"Planar Integration of Free-Space Optical Components" by Jurgen Jahns and Alan Huang, *Applied Optics*, vol. 28, No. 9, May 1, 1989.

*Primary Examiner*—Aristotelis Psitos
*Assistant Examiner*—Nabil Hindi
*Attorney, Agent, or Firm*—Panitch Schwarze Jacobs & Nadel

[57] ABSTRACT

An optical disk head which includes a substrate, a light path for allowing light beam to propagate in a zigzag form, having a thickness and width of 10 times greater than the wavelength, a light source optically connected to the light path so as to allow an incident light from the light source to propagate therethrough, a first light condenser optically connected to the light path so as to radiate the light beam propagated through the light path upon an object provided toward a top surface of the substrate, a second light condenser for guiding the light beam reflected from the object into the light path, and an optical detector for detecting the light beam propagated through the light path guided by the second light condenser.

44 Claims, 21 Drawing Sheets

Prior Art

AN OPTICAL DISK HEAD INCLUDING A LIGHT PATH HAVING A THICKNESS AND WIDTH GREATER THAN THE LIGHT BEAM WAVELENGTH BY A PREDETERMINED AMOUNT

BACKGROUND OF THE INVENTION

1. Field of the Invention:

The present invention relates to an optical disk head used in an optical recording apparatus, and a method for producing the same. More particularly, the present invention relates to an optical disk head which is thin and lightweight, and achieves easy mechanical alignment of components, and a method for mass-producing such optical disk heads.

2. Description of the Prior Art:

An optical recording apparatus includes an optical disk head so as to read signals recorded in an optical recording medium such as compact disks (CD), optical disks, and optical card memories. The optical head is necessarily equipped with a servocontrol such as a focus servo or a track servo.

There is a typical optical disk head known in the industry illustrated in "Autofocus Hitec Technologies" (edited by M. Kohno, published by Keiei System Kenkyusha) which will be described by reference to FIG. 1:

A light source 1 radiates a laser beam 17 which is made parallel by a collimator lens 18 and caused to pass through a beam splitter 19. Then it is focused on an optical disk 7 by an objective lens 20. The laser beam is reflected from the optical disk 7, and is made parallel by the objective lens 20. After being reflected from a boundary face 19' of the beam splitter 19, is introduced into a focus-track error detector optics 21 which includes a convex lens and a cylindrical lens. Thus, a reproducing signal, a focus-error signal and a track-error signal are read.

The known optical disk head shown in FIG. 1 has disadvantages in that the optical system becomes complex and the mechanical alignment of optical components requires high precision. Thus, the resulting optical head is likely to become large, heavy and costly.

In order to solve these problems, efforts are being made to develop optical integrated circuits including a substrate in which a waveguide and various optical components are provided. However, a difficulty arises from the fact that light beam is propagated throughout the waveguide as a wave having a crest-type distribution of light intensity, thereby requiring the light beam to be treated under the theory of wave optics. This means that the efficiencies at which a light beam is introduced into the waveguide and output therefrom are likely to reduce, and the optical information propagated through the waveguide is one-dimensional.

Japanese Laid-Open Patent Publications Nos. 2-301702, 2-301703 and 2-301704 disclose planar reflection optical devices. These devices employ a transparent substrate with reflective lenses so that a light beam is allowed to propagate in a zigzag form through the substrate but they have no optical pickup means for catching a light beam reflected from an optical recording medium. As a result, these devices cannot be used for an optical disk head.

SUMMARY OF THE INVENTION

The optical disk head of the present invention, which overcomes the above-discussed and numerous other disadvantages and deficiencies of the prior art, comprises a substrate, a light path for allowing light beam to propagate in a zigzag form, having a thickness and width of at least 10 times greater than the wavelength, a light source optically connected to the light path so as to allow an incident light from the light source to propagate therethrough, a first light condensing means optically connected to the light path so as to radiate the light beam propagated through the light path upon an optical recording medium provided over a top surface of the substrate, a second light condensing means for guiding the light beam reflected from the optical recording medium into the light path, and an optical detector for detecting the light beam propagated through the light path guided by the second light condensing means.

In a preferred embodiment, the thickness and width of the light path is not smaller then 100 times the wavelength of the light beam propagated through the light path.

In a preferred embodiment, the optical disk head is additionally provided with a position detecting optical means.

In a preferred embodiment, the light path is disposed within the substrate.

In a preferred embodiment, the first light condensing means is a diffractive optical component having a curved grating which comprises a plurality of curves which are bulged in the direction in which the light beam from the light source are propagated and symmetrical with respect to the center line of the propagating light beam.

In a preferred embodiment, the second light condensing means is a diffractive optical component having a grating which comprises a plurality of curves which are bulged in the opposite direction to the direction in which the light beam introduced into the light path by the second light condensing means are propagated and symmetrical with respect to the center line of the propagating light beam.

In a preferred embodiment, the position detecting optical means is an optical beam splitter.

In a preferred embodiment, the optical beam splitter is a reflex diffractive optical component disposed on the top surface of the substrate so as to face the optical recording medium, and has a pair of lenses, the pattern of each grating comprising a group of ellipses having equal eccentric ratios and major axes in the direction in which the light beam is propagated, wherein the centers of the ellipses are shifted one after another progressively in the opposite direction to the direction in which the light beam is propagated and the grating period diminishing toward the outside peripheries.

In a preferred embodiment, the optical beam splitter comprises a pair of reflex micro-Fresnel lenses disposed on the top surface of the substrate.

In a preferred embodiment, the light path comprises a collimator for collimating the light beam propagated through the light path from the light source.

In a preferred embodiment, the collimator is a reflex diffractive optical component.

In a preferred embodiment, the collimator comprises gratings which include a plurality of ellipses having major axes in the direction in which the light beam is propagated, wherein the centers of the curves are shifted one after another progressively in the direction in which the light beam is propagated.

In a preferred embodiment, the collimator is a micro-Fresnel lens.

In a preferred embodiment, the first and second light condensing means are transmission off-axis lenses disposed on the top surface of the substrate so as to face the optical recording medium, and wherein the beam splitter and the collimator are disposed on the top surface of the substrate.

In a preferred embodiment, the light source and the optical detector are disposed on the top surface of the substrate so as to face the optical recording medium.

In a preferred embodiment, the light source and the optical detector are disposed on the bottom surface of the substrate.

In a preferred embodiment, the light source and the collimator are disposed in correspondence to each other with the substrate being interposed, and wherein the optical detector and the optical beam splitter are disposed in correspondence to each other with the substrate being interposed.

In a preferred embodiment, the first and second light condensing means are reflex off-axis lenses, and disposed on the bottom surface of the substrate.

In a preferred embodiment, the second light condensing means is a transmission diffractive beam splitter, and disposed on the too surface of the substrate, and the split light beam is detected by the optical detector.

In a preferred embodiment, the second light condensing means comprises a pair of gratings which includes a plurality of curves bulged in the opposite direction to the direction in which the light beam introduced by the second light condensing means into the light path are propagated therethrough, the curves being symmetrical with respect to the center line of the propagating light beam.

In a preferred embodiment, the light source and the optical detector are disposed on the top surface of the substrate.

In a preferred embodiment, a light path for allowing light beam to propagate in a zigzag form, having a thickness and width of at least 10 times greater than the wavelength, a light source optically connected to the light path so as to allow an incident light from the light source to propagate therethrough, a light condensing means optically connected to the light path so as to radiate the light beam propagated through the light path upon an optical recording medium provided over a top surface of the substrate and for guiding the light beam reflected from the optical recording medium into the light path, and an optical detector for detecting the light beam propagated through the light path guided by the light condensing means.

In a prferred embodiment, the thickness and width of the light path are at least 100 times greater than the wavelength of the light beam propagated through the light path.

In a preferred embodiment, the optical disk head is additionally provided with a position detecting optical means.

In a preferred embodiment, the light path is disposed within the substrate.

In a preferred embodiment, the light condensing means is a diffractive optical component having a grating which comprises a plurality of curves which are bulged in the opposite direction to the direction in which the light beam from the light source are propagated and symmetrical with respect to the center line of the propagating light beam.

In a preferred embodiment, the position detecting optical means is an optical beam splitter.

In a preferred embodiment, the optical beam splitter is a reflex diffractive optical component for diffracting the light beam introduced by the light condensing means into the light path and propagated therethrough so as to direct the light beam sideways of the direction of propagation.

In a preferred embodiment, the light condensing means is a reflective type, and disposed on the bottom surface of the substrate.

In a preferred embodiment, the optical beam splitter, the light source, and the optical detector are disposed on the bottom surface of the substrate.

In a preferred embodiment, the beam splitter comprises a pair of curved gratings which are arranged perpendicularly to the direction in which the light beam is propagated, and are symmetrical to each other.

In a preferred embodiment, the optical disk head is additionally provided with a reflex collimator disposed on the bottom surface of the substrate, so as to collimate the light beam radiated from the light source and propagated through the light path.

In a preferred embodiment, the collimator is a reflex diffractive optical component and comprises curved grating which includes a plurality of ellipses having major axes in the direction in which the light beam is propagated, wherein the centers of the elliptical curves are shifted one after another progressively in the direction in which the light beam from the light source are propagated.

In a preferred embodiment, the beam splitter comprises a linear grating including a plurality of linear lines.

In a preferred embodiment, the light condensing means is a transmission type, and is disposed on the top surface of the substrate so as to radiate the light beam perpendicularly to the substrate.

In a preferred embodiment, the beam splitter is disposed on the top surface of the substrate, and the optical detector and the light source are disposed on the bottom surface thereof.

In a preferred embodiment, the beam splitter comprises a pair of curved gratings arranged on opposite sides of the direction in which the light beam is propagated through the light path, and are symmetrical to each other with respect to the light propagating direction.

In a preferred embodiment, the substrate is provided with a reflex collimator for collimating the light beam output from the light source and propagated through the light path.

In a preferred embodiment, the collimator is a diffractive optical component, and includes a plurality of elliptical curves having major axes in the direction in which the light beam is propagated, wherein the centers of the elliptical curves are shifted one after another progressively in the direction in which the light beam from the light source is propagated.

In a preferred embodiment, the beam splitter comprises a linear grating including a plurality of linear lines.

In a preferred embodiment, the substrate is provided with a reflex collimator for collimating the light beam from the light source and propagated through the light path.

In a preferred embodiment, the collimator is a diffractive type, and comprises a curved grating which includes a plurality of elliptical curves having major axes in the direction in which the light beam is propagated, wherein the centers of the elliptical curves are shifted one after another progressively in the direction in which the light beam from the light source is propagated.

In a preferred embodiment, the light condensing means is a transmission type, and disposed on the top surface of the substrate so as to radiate the light beam from the light source obliquely to the substrate.

In a preferred embodiment, the beam splitter comprises a pair of curved gratings arranged on opposite sides of the direction in which the light beam is propagated through the light path, and are symmetrical to each other with respect to the light propagating direction.

In a preferred embodiment, the beam splitter, the optical detector, and the light source are disposed on the top surface of the substrate.

In a preferred embodiment, the beam splitter is disposed on the top surface of the substrate, and the optical detector and the light source are disposed on the bottom surface of the substrate.

According to another aspect of the present invention, there is a method for fabricating an optical disk head, the method comprising the steps of preparing a substrate including a light path, preparing a single mold for molding diffractive optical components used as a light condensing means and ia position detecting optical means, and mounting the two diffractive optical components at one time on the substrate.

Thus, the invention described herein makes possible the objective of providing a small and lightweight optical disk head capable of easy alignment of components.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
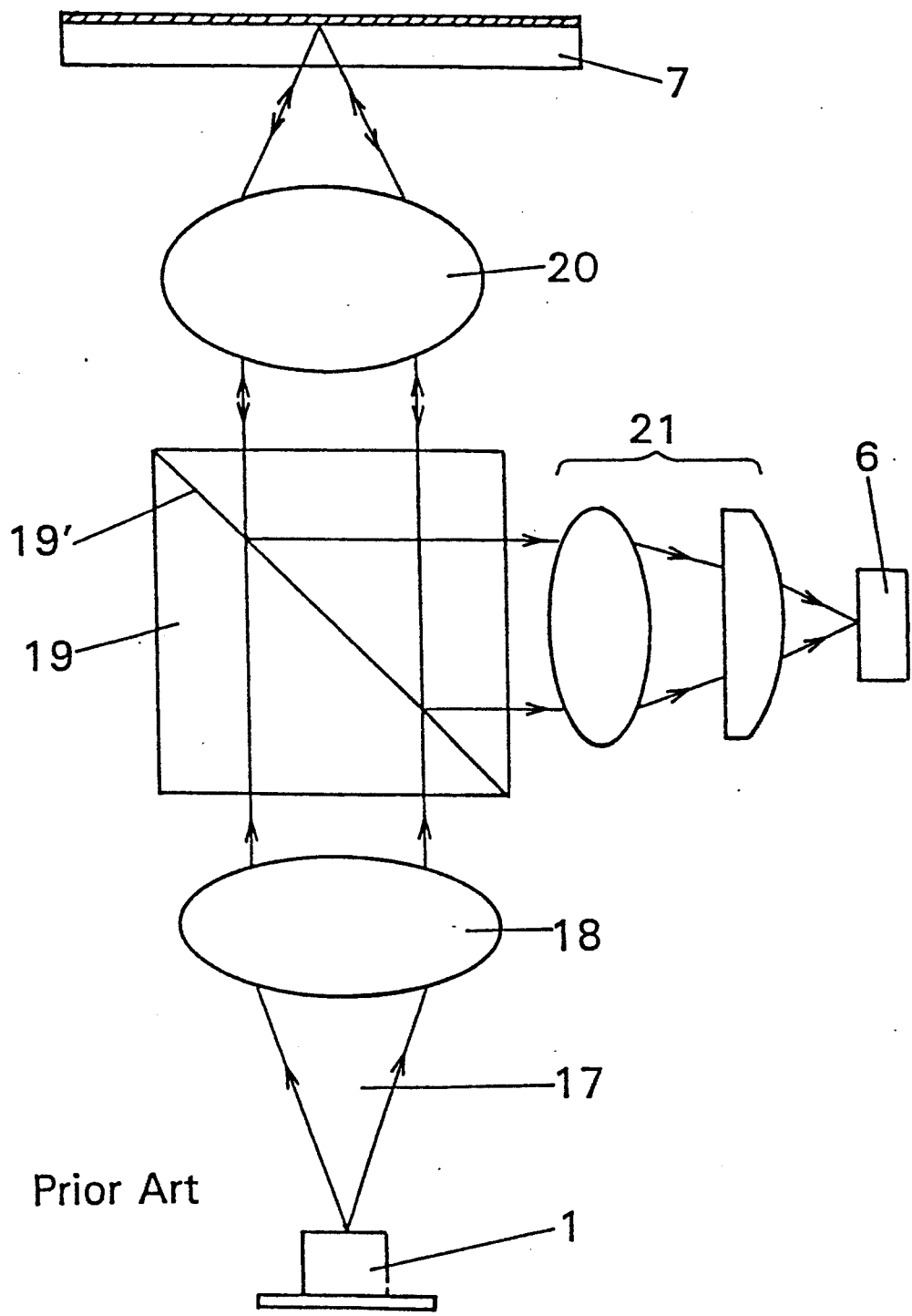
FIG. 1 is a diagrammatic view showing a prior art optical head.
Figure 2:
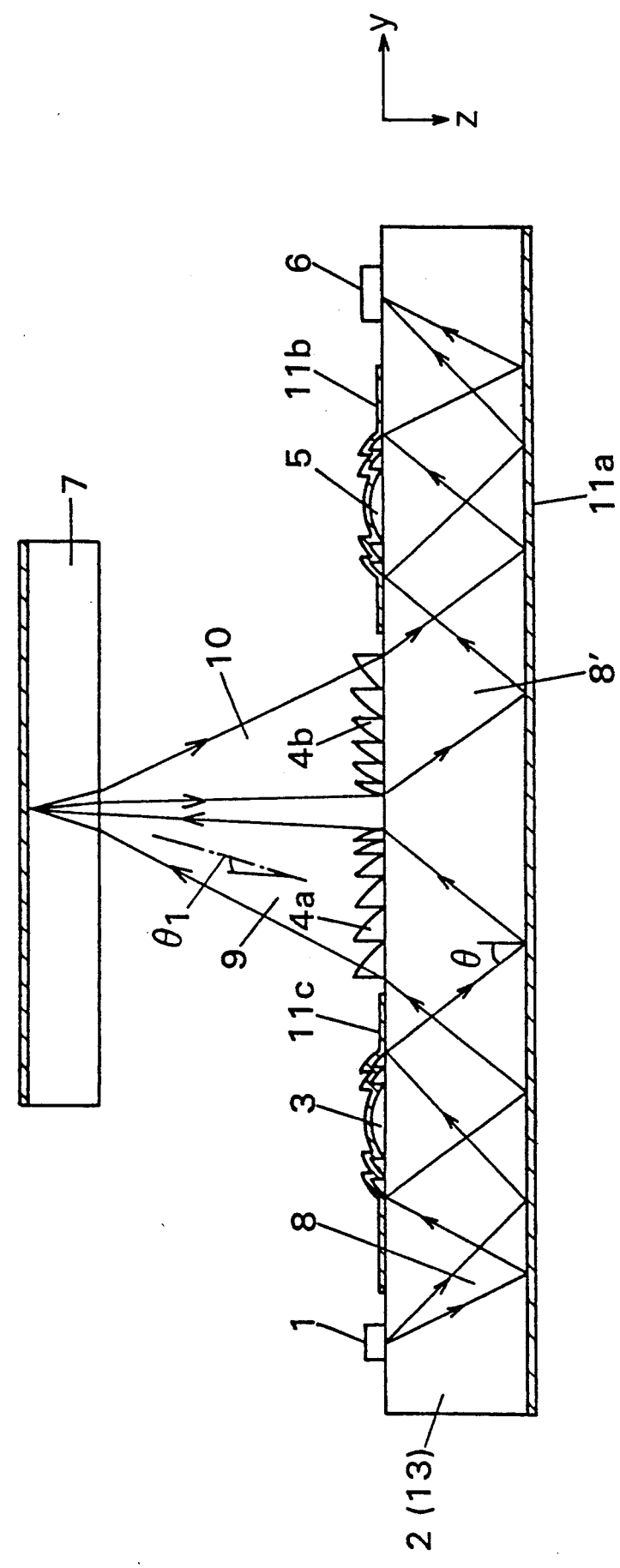
FIG. 2 is a cross-sectional view showing a structure of an optical head according to the present invention, particularly to show the propagation and focusing of light beam.
Figure 3:
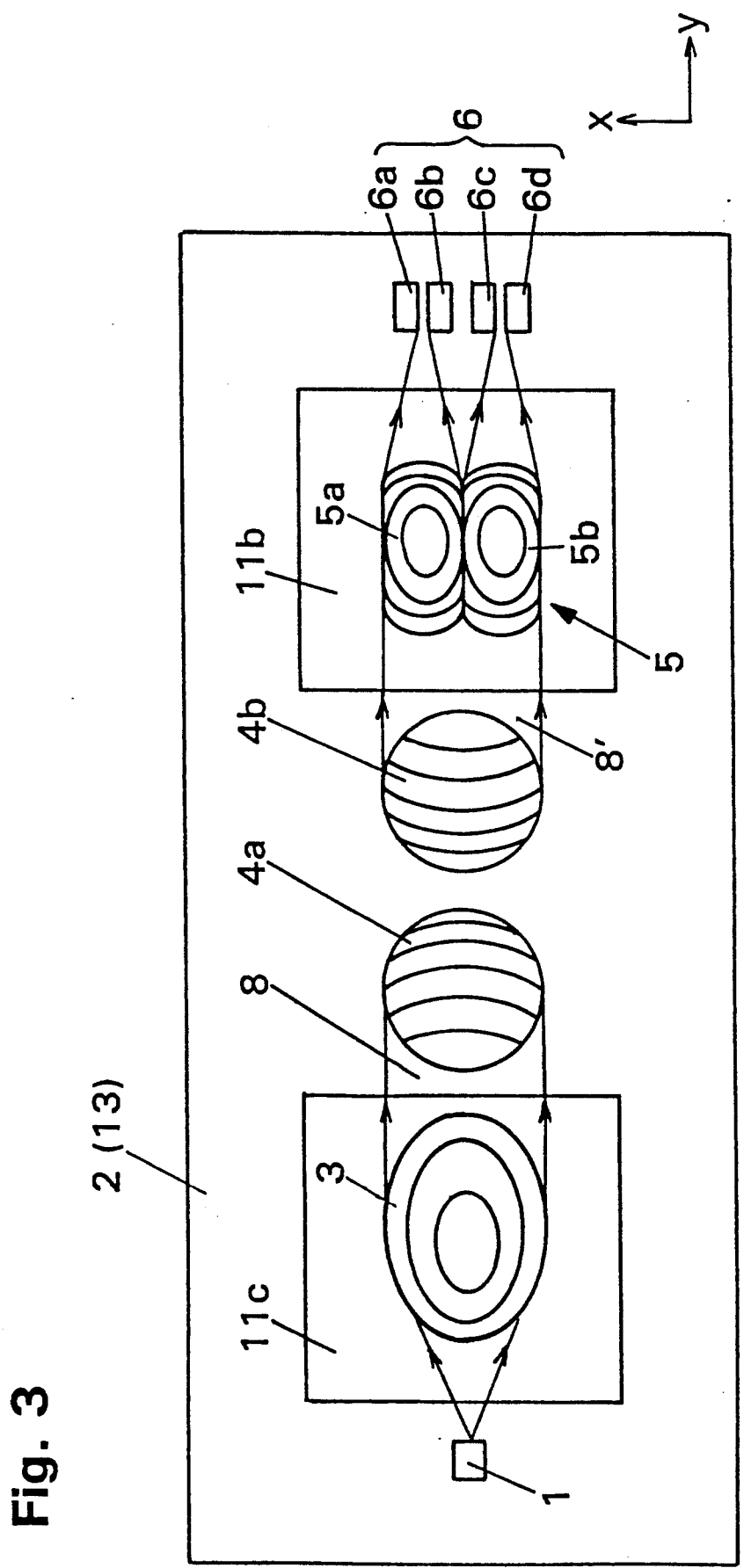
FIG. 3 is a plan view showing the arrangement shown in FIG. 2.

Referring to FIGS. 2 and 3, a light beam radiated from a light source 1 bounce within a substrate 2. An optical disk 7 is placed above the substrate 2. The surface of the substrate 2 that is opposite to the optical disk 7 is called "the top surface", whereas the opposite side of the top surface is called "bottom surface". More specifically, the light beam is reflected from the bottom surface of the substrate 2 so that they are propagated along zigzag paths 13. The substrate 2 is made of a glass plate having a thickness (in the direction of z) of 3 mm, a width (in the direction of x) of 10 mm, and a length (in the direction of y) of 25 mm. Any material can be used for the substrate 2 if it allows light waves to pass through. Glass plate such as quartz glass is desirable because of its resistance to heat. The substrate 2 is covered with a reflection layer 11a which can be a metal layer such as Al and Au or alternatively a dielectric layer.

The light source 1 such as a semiconductor laser element is mounted on one side of the substrate 2 so as to radiates laser beam having a wavelength of 0.78 μm. The laser beam is propagated through the zigzag path 13 in such a manner that the optical axis is inclined at 30° to the z axis. On the top surface of the substrate 2 are provided a reflex-type diffractive collimator lens 3 (hereinafter referred to as "collimator"), transmission condenser lenses 4a, 4b and a pair of reflex-type diffractive beam splitters 5 having a pair of lenses 5a and 5b in this order.

The laser beam propagated along the zigzag path 13 is reflected from the reflection layer 11a and are introduced into the collimator 3, made of a lens having a focal length of 6.9 mm and a diameter of 3 mm. The collimator 3 maintains the angle θ, for example, 30° at which the laser beam is propagated, and collimates the laser beam. The collimated light beam with a width of 2.5 mm is propagated along the zigzag path 13, and is output by a transmission condenser lens 4a having a diameter of 3 mm and a focal length of 3 mm from the substrate 2 toward the optical disk 7 with an angle $\theta_1$.

The laser beam 9 is focused on the optical disk 7 and reflected therefrom. The reflected laser beam 10 is introduced into a second transmission condenser lens 4b having a focal length of 3 mm and a diameter of 3 mm. The input laser beam 10 is collimated and propagated as propagating light beam 8' along the zigzag path 13 at a predetermined angle. In this way the propagating light beam 8' is introduced into the reflex-type diffractive beam splitter 5 having a pair of lenses 5a and 5b which are covered with a reflection layer 11b. The lenses 5a and 5b have lengths of 3 mm in the directions of y and x, and a focal length of 6.9 mm. The incident light beam to the lenses 5a and 5b are split into two beam, and after being reflected from the bottom surface of the substrate 2, they are introduced into an optical detector 6. The optical detector 6 includes four detecting sections 6a to 6d arranged perpendicular to the direction of propagation so that each light intensity measured by each detector is utilized as a reproducing signal, a focusing error signal and a track-error signal.

The collimator 3 and the diffractive beam splitter 5 can be made of an in-line type reflex diffracting optical lens having a curved grating whose maximum depth or thickness is 0.28 μm. The transmission condenser lenses 4a and 4b can be made of off-axis diffractive lenses each having a curved grating whose maximum depth is 1.3 μm. Both collimator 3 and the condenser lenses 4a, 4b focus the light beam by utilizing the optical diffraction. The in-line type diffractive optical lens in a lens which ensures that the angle of the optical axis of an incident light is in agreement with that of the output light. The off-axis diffractive lenses ensure that the angle of the optical axis of an incident light is not in agreement with that of the output light. In general, diffraction lenses are a few μm thin at most, and it is possible to integrate these lenses on the surface of the substrate 2, thereby facilitating the alignment of these lenses. Accordingly, a lightweight, stabilized optical disk head can be achieved.

In this example, the curved gratings in the collimator 3 and the lenses 5a and 5b in the diffractive beam splitter 5 are formed with multiple elliptical curves within the zigzag path 13 wherein the elliptical curves have major axes in the direction of y with the same eccentric ratio. Each curve has diminishing grating period toward the periphery. The centers of the elliptical gratings are shifted toward the input or output sides (in a lens 3 toward the output side, that is, in the direction of y and in a lens 5 or diffractive beam splitter toward the input side, that is, the direction of −y). The curved gratings are advantageous in that neither coma nor astigmatism occur, thereby facilitating the collimation and focusing.

The collimator 3, that is, the in-line type reflex diffractive collimator which will be described in greater detail:

In order to constitute the lens 5a or 5b, the phase shift Φ, when it is in the coordinate system of which is the origin is the lens center, is expressed by:

$$\Phi(x, y) = n'k[\sqrt{x^2 + (f \cdot \sin\theta + y)^2 + f^2 \cdot \cos^2\theta} - f - y \cdot \sin\theta] - 2m\pi$$

where f is the focal length, λ is the wavelength of the light source, n' is the refractive index and θ is the angle of propagation, wherein k=2π/λ and m is an integer which satisfies 0≦Φ≦2π.

If the maximum thickness of the lens or the maximum depth of the groove is $L_{max}$, the value Φ corresponds to the distribution of L thickness of the lens, which is expressed as follows:

$$L(x, y) = L_{max}(1 - \Phi/2\pi)$$

If Φ is zero, it will be inferred what pattern the grating will take with no thickness, and the grating pattern can be inferred to be an ellipse which has a center at the position (0, mλtanθ/n'cosθ), with the lengths of the major axis and the minor axis expressed as follows:

The length of the major axis:

$$2/\cos\theta \cdot \sqrt{m^2\lambda^2/n'^2\cos^2\theta + 2m\lambda f/n'}$$

The length of the minor axis:

$$2\sqrt{m^2\lambda^2/n'^2\cos^2\theta + 2m\lambda f/n'}$$

Thus, the ratio of the major axis to minor axis=1-/cosθ

It will be understood that the ratio of the major axis to the minor axis and the shift of the center of the ellipse increase with an increase in the incident angle θ. This phenomenon can be verified by analysis based on the ray approximation theory.

Off-axis transmission diffractive lenses used as transmission condenser lenses 4a and 4b have a plurality of curves of arched pattern or parabola arranged in the direction in which the light beam is propagated. Each curved grating is bulged in the opposite direction to the input or output sides. The output condenser lens 4a has grooves of an arched shape bulged in the direction in which light beam is propagated (in the y direction), and its grating period diminishes progressively in the light propagating direction. The input condenser lens 4b has grooves of an arched shape bulged in the opposite direction to the direction in which the light beam is propagated, and its grating period increases progressively in the direction in which the light beam is propagated. The curved gratings of the condenser lenses 4a and 4b are symmetrical with respect to the center line of the light beam.

The output off-axis condenser lens 4a will be described in greater detail:

When the focal length is $f_1$, the wavelength of laser beam from the light source 1 is λ, the index of refraction of the light path is n′, the angle of propagation is θ, the angle of projection from the lens 4a is $\theta_1$, the phase shift $\theta_1$ is expressed as follows:

$$\Phi_1(x, y) = k[\sqrt{x^2 + (f_1\sin\theta_1 - y)^2 + f_1^2\cos^2\theta_1} - f_1 + n'y \cdot \sin\theta] - 2m\pi$$

wherein m is an integer which satisfies $0 \leq \Phi_1 \leq 2\pi$.

It will be understood from this equation that the pattern of the grating having no thickness has a center at the position expressed by:

$$(0, -[n'\sin\theta(m\lambda+f_1)-f_1\sin\theta_1/(1-n'^2\sin^2\theta))$$

Herein, if the length of the major axis is 2a, the grating will become an elliptical pattern with a minor axis 2b which is $2a\sqrt{1-n'^2\sin^2\theta}$. The ratio of the major axis to the minor axis is $1/\sqrt{1-n'^2\sin^2\theta}$, wherein a is expressed by the following equation:

$$a = \sqrt{\frac{m^2\lambda^2 + 2f_1 m\lambda + n'^2 f_1^2 \sin^2\theta_1}{-2n'f_1(m\lambda + f_1)\sin\theta\sin\theta_1} + f_1^2\sin^2\theta_1} \bigg/ (1 - n'^2\sin^2\theta)$$

The center of the ellipse is spaced from the region of the lens 4a in the direction of −y, and the grating of the lens 4a becomes an arched curve in the end portion of the major axis of the elliptical curve. This is verified by analysis based on the ray approximation theory.

Preferably, the collimator 3, the condenser lenses 4a and 4b, and the beam splitter 5a and 5b have saw-tooth cross-sections so that they enable the light beam to reflect from or to pass through highly efficiently. Patterns of these optical components can be made on an extra substrate. An electron beam resist such as PMMA or CMS with an appropriate thickness is coated on the substrate. Then, an electron beam is radiated on the resist controlling the electron beam dose. A mold is fabricated from this pattern by a nickel electrotyping or any other suitable method. By using the mold, the lenses 3, 4a, 4b and 5 are formed on the substrate 2 using the UV-setting resin or the like. This method ensures that these components are in exact alignment, and that they have the same characteristics. The diffractive lenses 3 and 5 are covered with the reflection layers 11c and 11b such as Ag, Al or Au.

In addition, the reflection layers 11b and 11c are covered with a protective layer from a thickness of 1000 angstroms to a few μm, which includes metal layers such as Cu or Cr, synthetic resin layers such as UV hard resin, paint such as lacquer, dielectric multi-layers or any other protective layers such as SiO, $SiO_2$, $MgF_2$, SiC, graphite, diamond. The protective layers protect the reflection layer from being damaged or scratched and from being oxidized. The protective layer is of particular advantage when an Ag layer is used because silver is liable to oxidizing.

The signals recorded in the optical disk are reproduced in accordance with the sum of light intensities measured by the detecting sections 6a, 6b, 6c, and 6d in the optical detector 6.

The optical detector 6 also monitors a focus-error signal and a track error signal. A focus-error signal is detected by a known method. As shown in FIG. 3, the pairs of detecting sections 6a and 6b and 6c and 6d are arranged so that light beams split by the beam splitter 5 are focused at the center between each pair of detecting sections. The focus error signal is obtained from the difference between the outputs from the detecting sections 6a and 6b (6a−6b) or the difference between the outputs from the detecting sections 6d and 6c (6d−6c). When the optical disk 7 is exactly positioned at the point of focus, the focus-error signal becomes zero. When the optical disk 7 moves in the −z direction away from the substrate 2, the propagating light beam 8′ becomes a converging spherical wave, thereby causing the split two light beams to approach each other. Thus the focus error signal becomes minus. In contrast, when the optical disk 7 moves from the point of focus along the z axis near to the substrate 2, the propagating light beam become a diverging spherical wave, and the split propagating light beams move apart from each other. Thus, the focus-error signal becomes plus. By using this focus-error signal, the focusing is controlled.

A track-error signal is detected by the difference in light intensity between the propagating light beams split by a known push-and-pull method. More specifically, the track-error signal is detected by subtracting the sum of the outputs of the detecting sections 6c and 6d from the sum of the other detecting sections 6a and 6b (6a+6b−6c−6d). When the track error signal is zero, an exact tracking is achieved, and when the track error signal is other than zero, it indicates that an out-of-track occurs. Adjustment is needed. In this way the detection of a track-error signal enables the control of tracking.

The controls of focusing and tracking are performed by moving the substrate 2 as a whole by an actuator to an optimum position on the basis of the error signals detected.

The length of the zigzag path 13 depends upon the sizes of the collimator 3, the condenser lenses 4 and the beam splitter 5 (in the order of a few mm). The width and thickness are also in the order of a few mm. Thus, the path 13 can be formed in various patterns such as in a zigzag form so that light beam can be propagated not as wave but as ray. This is a solution to the problems of the known optical devices having optical waveguide which must be handled in accordance with the wave optics theory. In the present invention, when the thickness and width of the light path 13 are ten times greater than the wavelength, the light beam is propagated through the path 13 as rays rather than as waves. If they are 100 times greater than the wavelength, the light beam is propagated as a perfect ray. The present invention requires that the light path 13 is at least 10 times thicker then the wavelength of light, preferably 100 times thicker.

EXAMPLE 2

Figure 4:
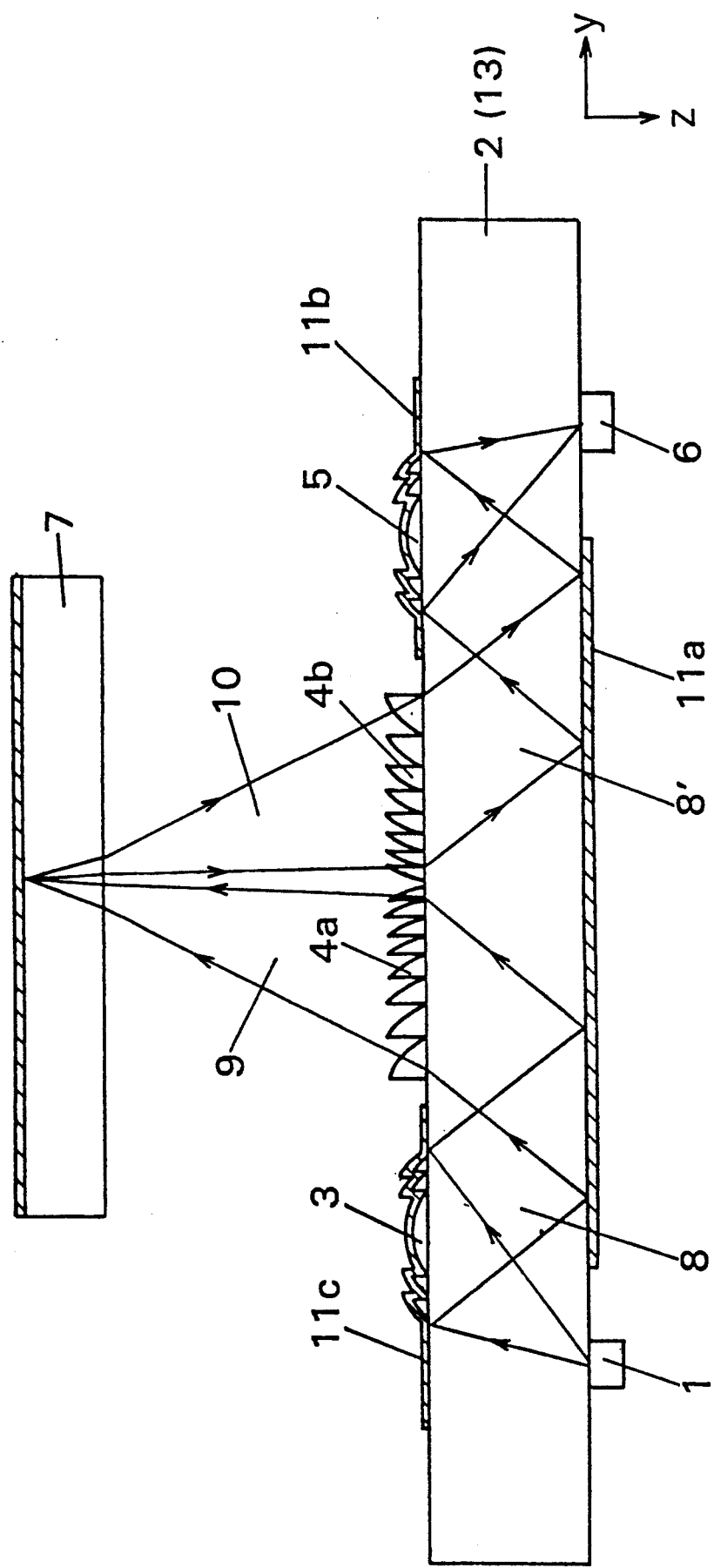
FIG. 4 in a cross-sectional view showing a structure of a second example of the optical head according to the present invention, particularly to show the propagation and focusing of light beam.

Referring to FIG. 4, this example is different from Example 1 in that the light source 1 and the optical detector 6 are mounted on the opposite surface of the substrate 2 to the optical disk 7. This arrangement is advantageous in that the optical detector 6 and the light source 1 (a semiconductor laser generator) are not likely to come into contact with the optical disk 7. Thus, a relatively free layout is possible for positioning these components. In addition, since the light source 1 and the optical detector 6 can be located near an electric control circuit, the electric wiring is simplified.

EXAMPLE 3

Figure 5:
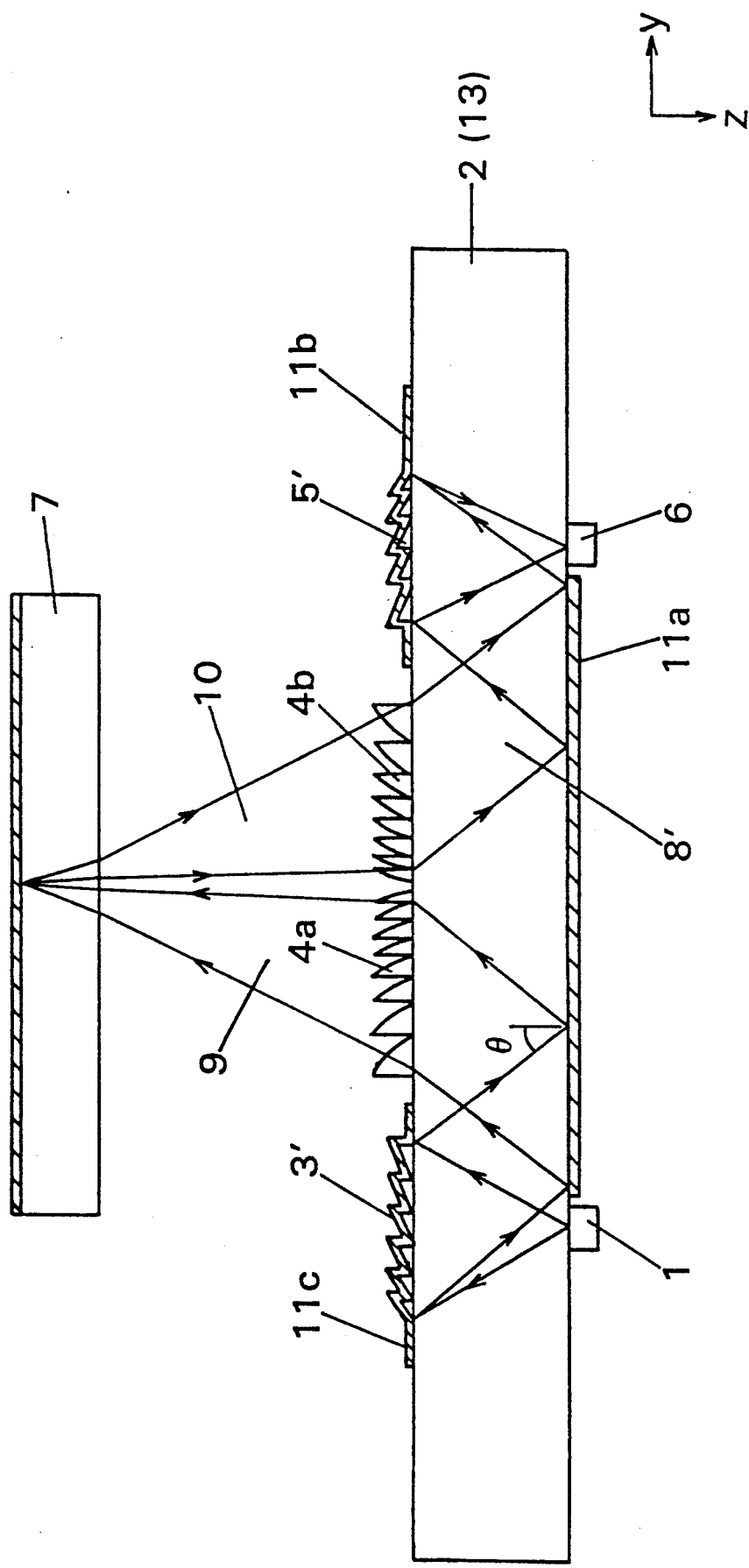
FIG. 5 is a cross-sectional view showing a structure of a third example of the optical head according to the present invention, particularly to show the propagation and focusing of light beam.
Figure 6:
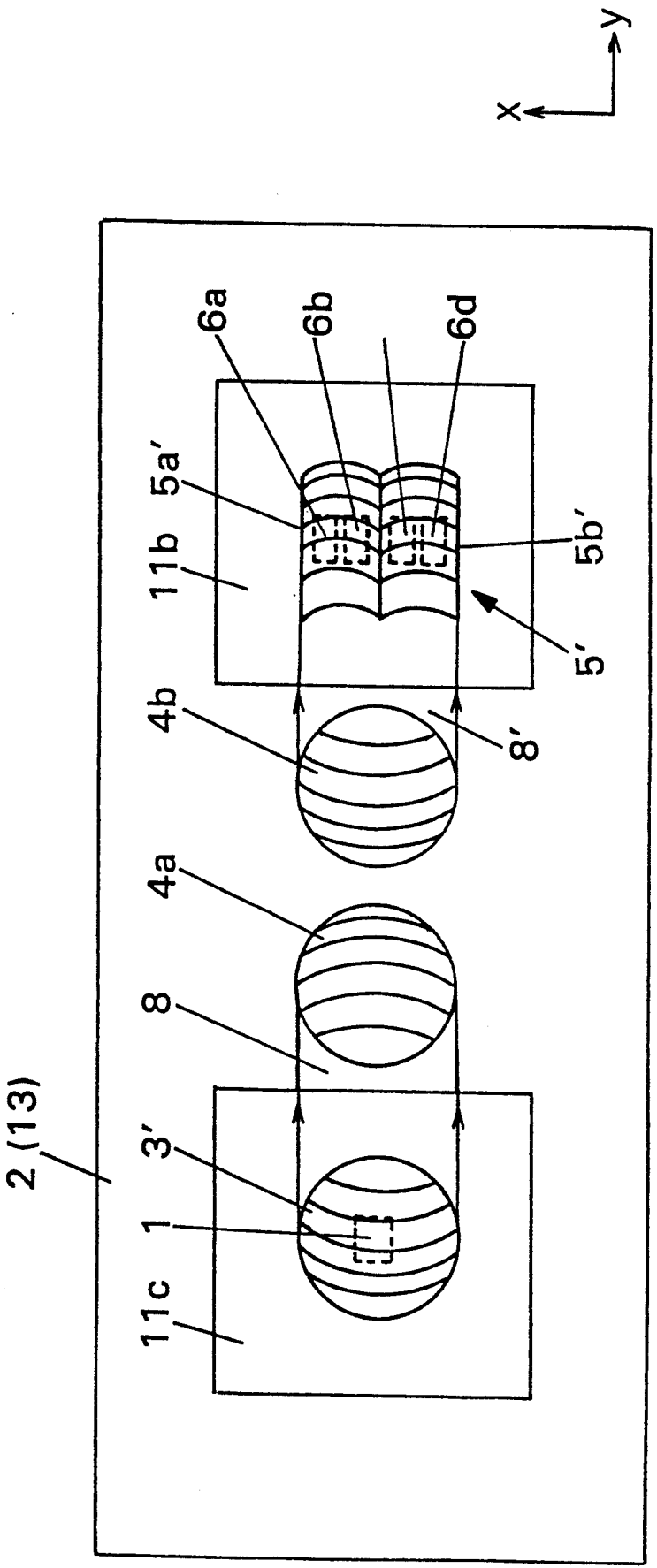
FIG. 6 is a plan view showing the arrangement of FIG. 5.

Referring to FIGS. 5 and 6, this example is different from Example 2 in that the collimator 3' and the beam splitter 5' are made of off-axis diffractive lenses so that the optical axes of the light beam generated from the light source 1 and the light beam incident to the optical detector 6 are vertical to the substrate 2 (in the z direction), and the light source 1 and the optical detector 6 are positioned right below the lenses 3' and 5' on the substrate 2, respectively. The other arrangement is the same as that in FIG. 4. Since the optical axes of the light beam emitted from the light source 1 and the light beam incident to the optical detector 6 are vertical to the substrate 2, the output surface of the light source 1 and the surface of the optical detector 6 are allowed to be parallel to the substrate 2. This facilitates the mounting of the optical detector 6 and the light source 1 on the substrate 2. It is effective to use either the off-axis collimator lens 3' or the off-axis beam splitter so as to make the output surface of the light source 1 vertical to the substrate 2.

The grating patterns of the off-axis reflective lens 3' and 5' are similar to that of the transmission condenser lens 4. The grating of the lenses 3' and 5' consist of multiple curves which are bulged or parabolic in opposite directions to the input side or the output side of substantially parallel light beam, and the grating period of the collimator 3' becomes gradually large in the direction in which the light beam Is propagated. The curves of each grating are symmetrical to the central axis extending in the direction of propagation. The gratings 5a' and 5b' of the beam splitter 5 have grating periods which diminish in the direction of propagation (in the y direction).

The off-axis collimator 3' will be described:

When the focal length is $f_2$, and the wavelength of the light source 1 is $\lambda$, the index of refraction of the zigzag path 13 is n', and the angle of propagation is $\theta$, the phase shift $\Phi_2$ in the coordinates system of which the origin is the lens center will be expressed by:

$$\Phi_2(x, y) = n'k[\sqrt{x^2 + y^2 + f_2^2} - f_2 - y \cdot \sin\theta] - 2m\pi.$$

wherein m is an integer which satisfies $0 \leq \Phi_2 \leq 2\pi$.

It will be understood from this equation that the pattern of the grating having no thickness has a center at the position expressed by:

$$(0, (f_2 + m\lambda/n')\tan\theta/\cos\theta)$$

The length of the major axis is expressed by:

$$2/\cos^2\theta \cdot \sqrt{m^2\lambda^2/n'^2 + 2m\lambda f_2/n' + f_2^2\sin^2\theta}.$$

The ratio of the major axis to the minor axis is $1/\cos\theta$. The center of the ellipse is separated in the y direction from the position of the lens 3'; therefore, the grating pattern of the lens 3' becomes bulged or arched which is symmetrical with respect to the major axis in the neighborhood of end portions of the major axis. This phenomenon is verified by analysis based on the ray approximation theory.

By combining the lenses 3' and 5' of an off-axis type, changes in the angle of diffraction due to variations in the wavelengths of the light source 1 can be mutually negated, thereby preventing the deterioration of optical characteristics.

EXAMPLE 4

Figure 7:
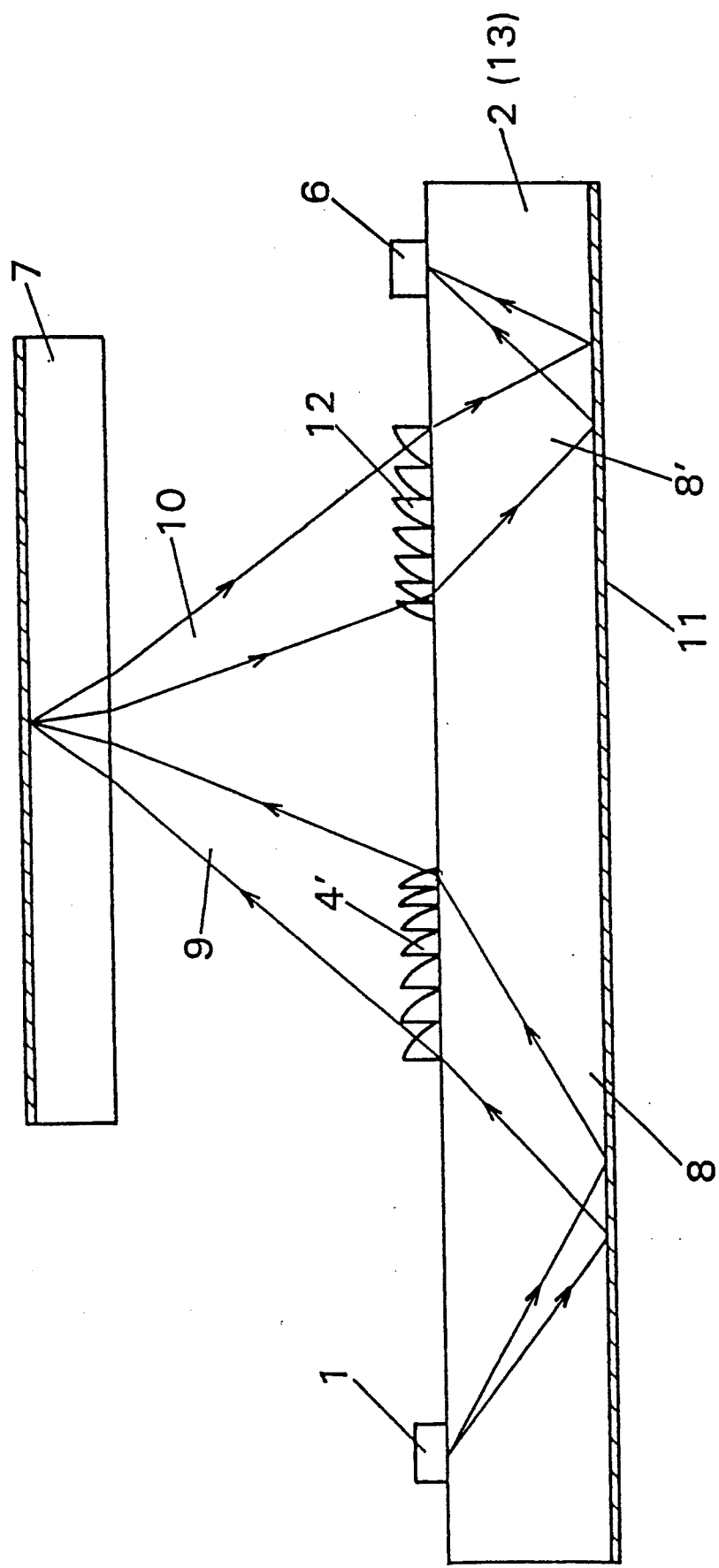
FIG. 7 is a cross-sectional view showing a structure of a fourth example of the optical head according to the present invention, particularly to show the propagation and focusing of light beam.
Figure 8:
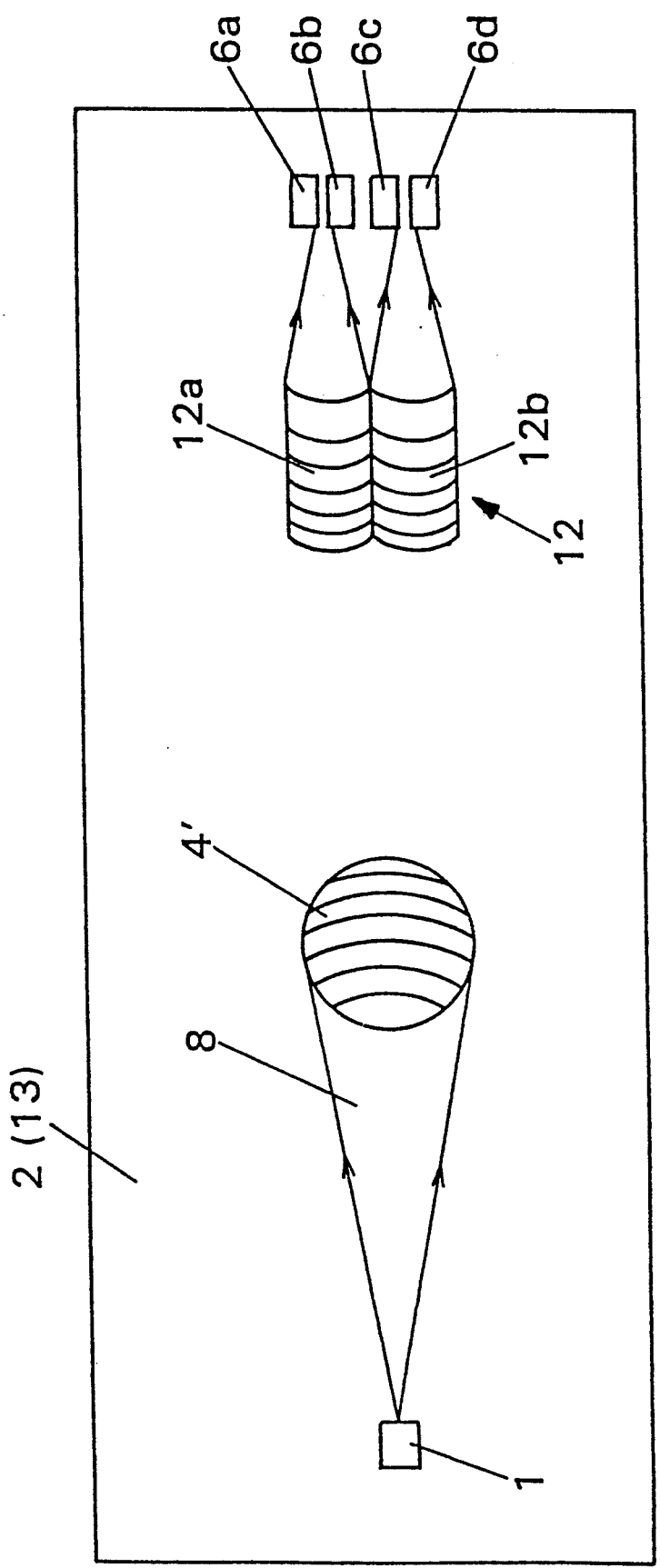
FIG. 8 is a plan view showing the arrangement of FIG. 7.

Referring to FIGS. 7 and 8, the light source 1, the diffracting grating condenser lens 4', a condenser lens 12 as a beam splitter, and the optical detector 6 are mounted on the top surface of the substrate 2 in the direction of propagation. The bottom surface of the substrate 2 is covered with a reflection layer. The grating condenser lens 4', having a similar grating pattern to that of the diffractive condenser lens 4a in Example 1, also functions as a collimator 3. The condenser lens 12 has the gratings 12a and 12b with almost the same pattern as those of the gratings 5a' and 5b'.

The light beam generated from the light source 1 is reflected from the bottom of the substrate 2, and passed through the condenser lens 4' and are focused on the optical disk 7. The light beam reflected from the optical disk 7 is split by the gratings 12a and 12b, and entered into the zigzag path 13. The propagating light beam 8' in the zigzag path 13 is led into the optical detector 6 having detecting sections 6a to 6d.

In this example, the condenser lens 4' functions as a collimator, and the condenser lens 12 functions as a beam splitter. Thus, the number of components can be reduced, thereby resulting in a compact size and avoiding the lose of light.

EXAMPLE 5

Figure 9:
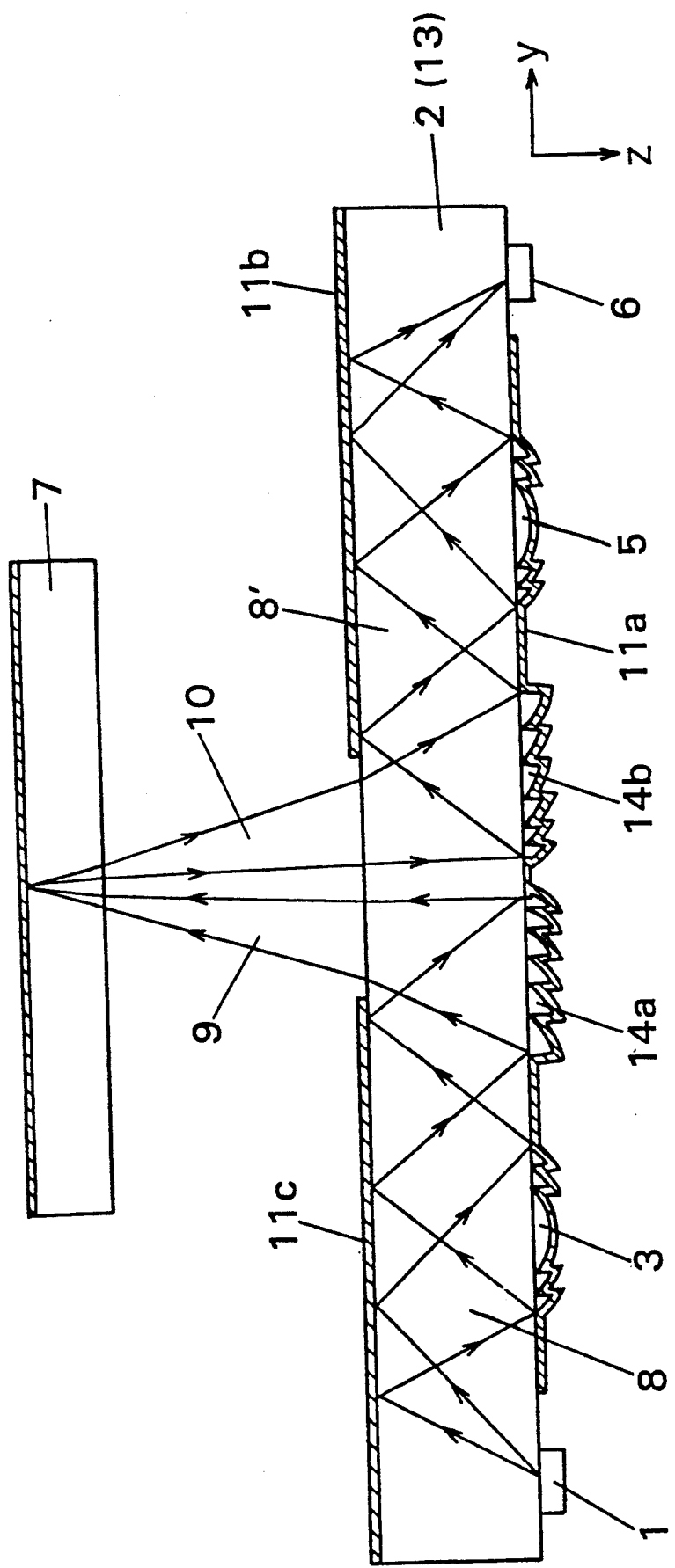
FIG. 9 is a cross-sectional view showing a structure of a fifth example of the optical head according to the present invention, particularly to show the propagation and focusing of light beam.

Referring to FIG. 9, the optical components are disposed on the bottom surface of the substrate 2. Instead of the transmission condenser lenses 4a and 4b in Example 1, reflex condenser lenses 14a and 14b are employed. The other optical components are the same as those used in Example 1, except for the provision of them on the bottom surface. The bottom surface of the substrate 2 is covered with a reflection layer 11a excluding an area near the light source 1 and the optical detector 6. The top surface of the substrate 2 is covered with reflection layers 11c and 11b excluding an area through which the light beam reflected from the condenser lens 14a is output toward the optical disk 7 and returned toward the condenser lens 14b.

When a reflection lens is used for a condenser lens, the optical characteristics are enhanced if the numerical aperture is relatively large, for example, 0.45. When a reflex lens is used for a diffractive lens, the thickness of the grating can be reduced by 1/5 compared with when a transmission lens is used. This facilitates the electron-beam drawing method, and enhances the fine patterning. However, the reflex condenser lenses 14a and 14b must be provided on the bottom surface of the substrate 2, thereby prolonging the focal length by the thickness of the substrate 2. If the numerical aperture of the lens is to be identical to that of the condenser lens 4, it is required to enlarge the diameter of the lens.

EXAMPLE 6

Figure 10:
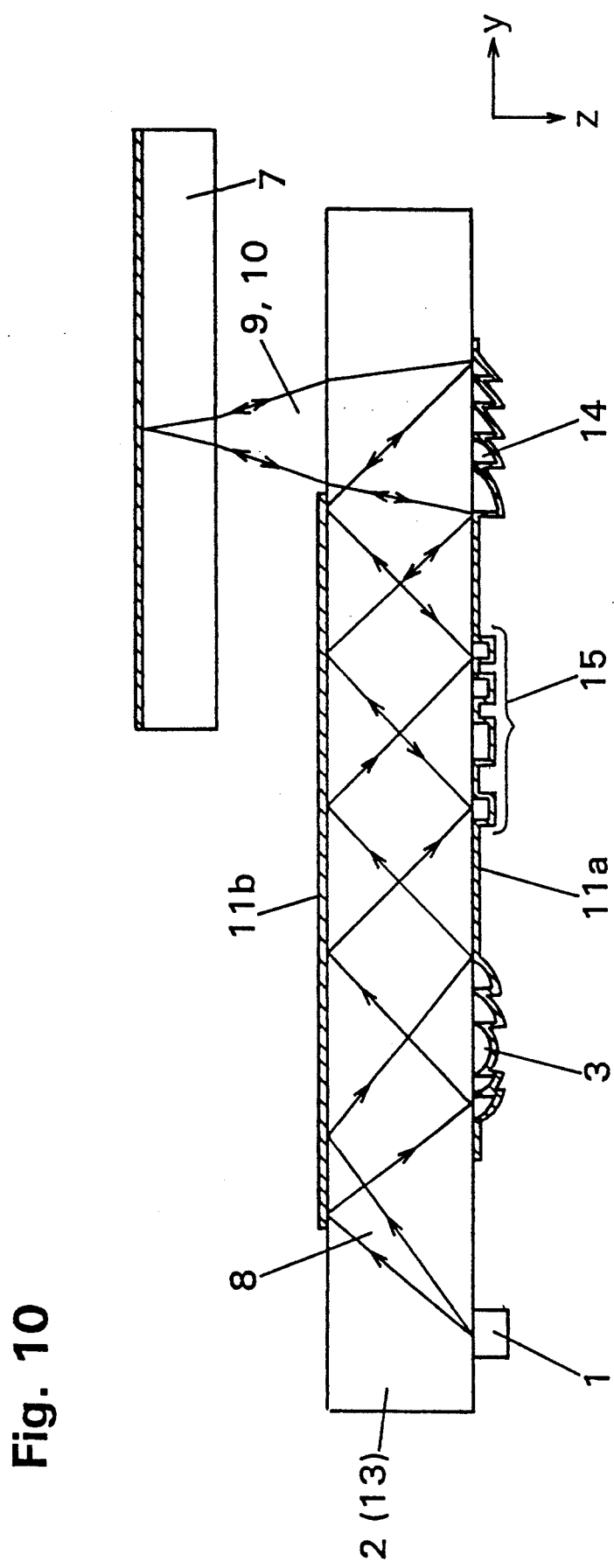
FIG. 10 is a cross-sectional view showing a structure of a sixth example of the optical head according to the present invention, particularly to show the propagation and focusing of light beam.
Figure 11:
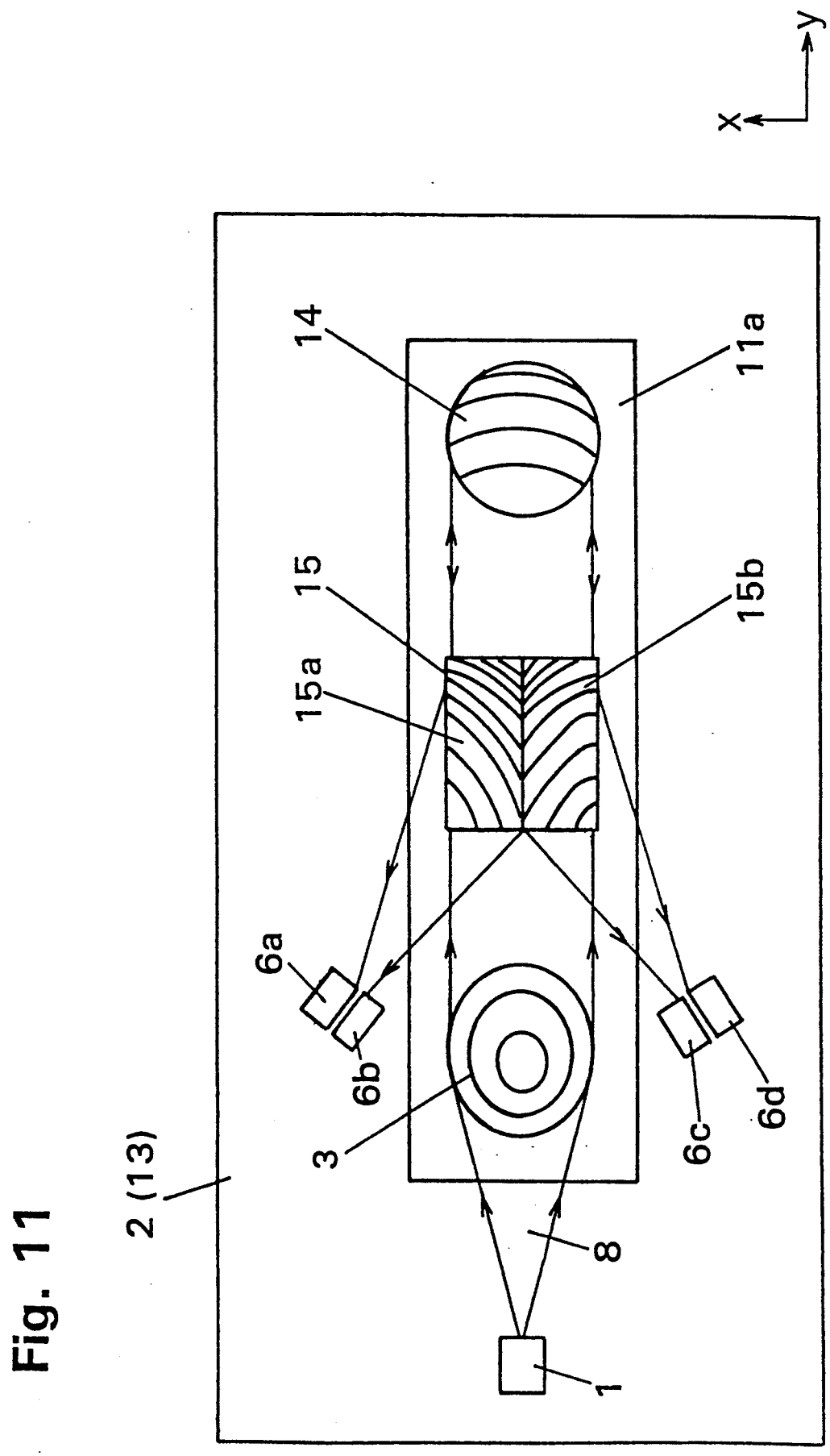
FIG. 11 is a plan view showing the arrangement of FIG. 10.

Referring to FIGS. 10 and 11, all the optical components are disposed on the bottom surface of the substrate 2. A reflex grating collimator 3, a reflex grating beam splitter 15 having a curved grating, and a reflex grating condenser lens 14 are disposed at intervals in the direction in which light beam is propagated. On each side of the reflex diffractive collimator 3 are disposed pairs of detecting sections 6a and 6b, and 6c and 6d.

The bottom surface of the substrate 2 is covered with a reflection layer 11a which covers the neighborhood of the collimator 3 up to the neighborhood of the reflex diffractive condenser lens 14. The top surface of the substrate 2 is covered with a reflection layer 11b excluding an area opposite to the condenser lens 14.

The diffractive condenser lens 14 has a plurality of curves bulged in the opposite direction to the direction in which the light beam from the light source 1 is propagated, wherein the curves are symmetrical with respect to the central axis extending in the direction of propagation.

The light beam emitted from the light source 1 is reflected from the reflection layer 11b on the top surface of the substrate 2 and collimated by the collimator 3. The light beam reflected from the collimator 3 reach the reflex condenser lens 14 and reflect therefrom. Then, the light beam is let to the optical disk 7 which is projected perpendicularly to the substrate 2, and reflect from the condenser lens 14. The reflected light beam is propagated through the zigzag path 13 in the direction of −y. This light beam is split by the beam splitter 15 and passed through the pairs of detecting sections 6a and 6b, and 6c and 6d, respectively.

The beam splitter 15 includes a pair of lenses 15a and 15b, which are inclined in the grating direction so as to split the light beam propagated through the zigzag path 13 sideways with respect to the direction of propagation (the direction of −y). The cross-sections of the curved gratings are rectangular.

As is evident from the foregoing examples, the light beam emitted from the light source 1 and that reflected from the optical disk 7 are propagated in opposite directions through the zigzag path 13. The folded track system reduces the size of the optical disk head. Because of the rectangular cross-section of the beam splitter 15, the efficiency of diffraction becomes about 40% to 50%, and as a whole the loss of light beam is minimized.

EXAMPLE 7

Figure 12:
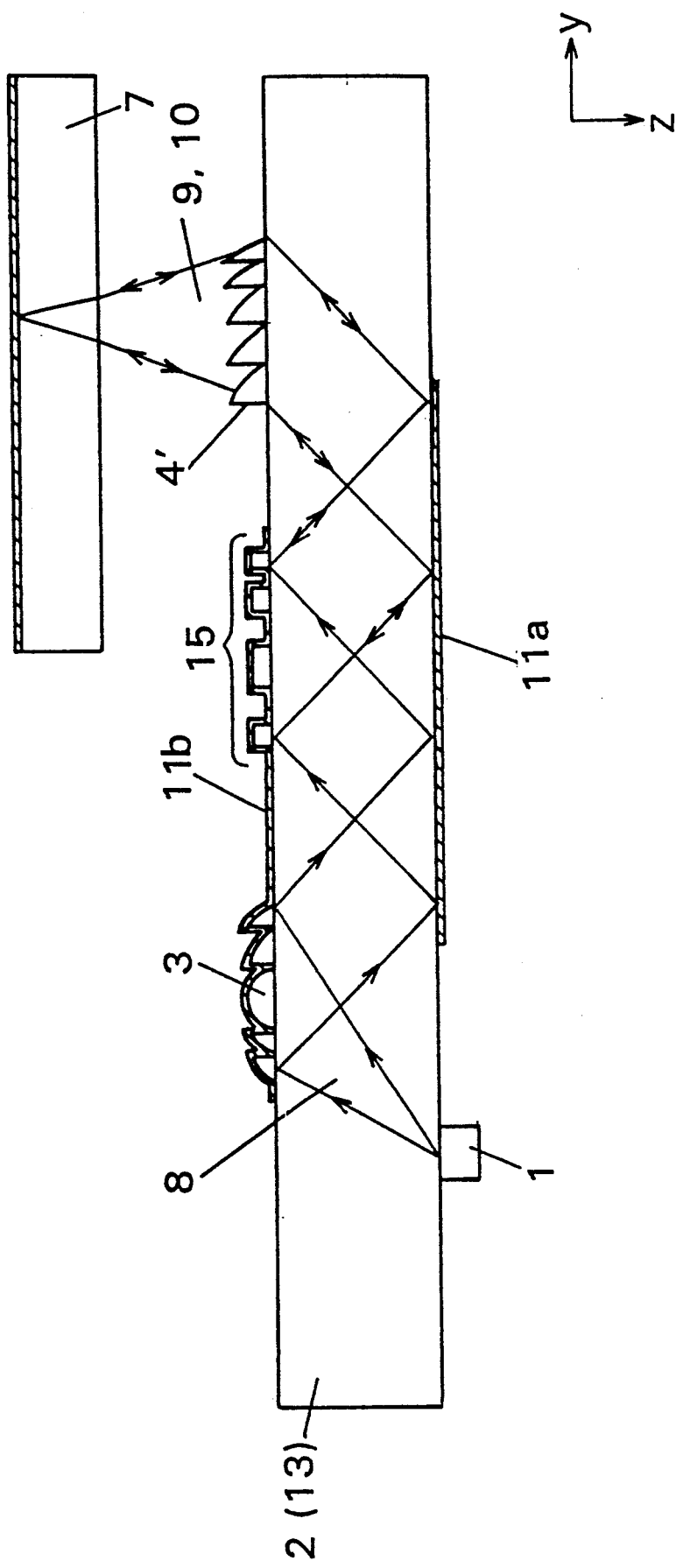
FIG. 12 is a cross-sectional view showing a structure of a seventh example of the optical head according to the present invention, particularly to show the propagation and focusing of light beam.

Referring to FIG. 12, the light source 1 is disposed on the bottom surface of the substrate 2, and the reflex collimator 3, the reflex beam splitter 15, and the off-axis transmission condenser lens 4' are disposed on the top surface of the substrate 2 in the direction in which light beam is propagated. The light beam emitted from the light source 1 and propagated through the zigzag path 13 is projected perpendicularly to the substrate 2 through the transmission lens 4' and reach the optical disk 7. They reflect from the optical disk 7 and are introduced into the zigzag path 13 through the condenser lens 4'. The other structure is the same as that of Example 6.

In this example, the light beam is obliquely projected onto the transmission condenser lens 4', and output therefrom perpendicularly to the substrate 2.

EXAMPLE 8

Figure 13:
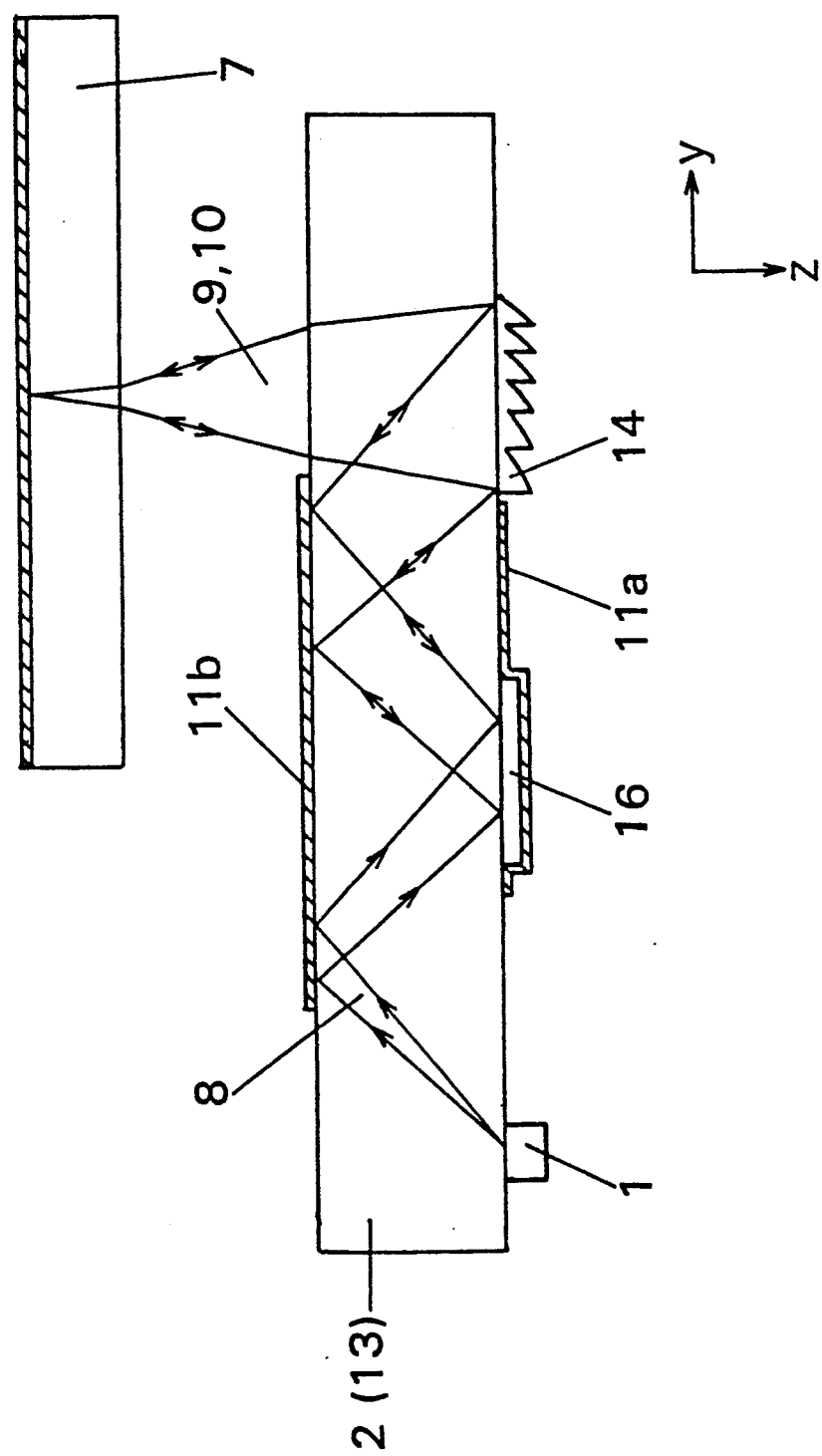
FIG. 13 is a cross-sectional view showing a structure of an eighth example of the optical head according to the present invention, particularly to show the propagation and focusing of light beam.
Figure 14:
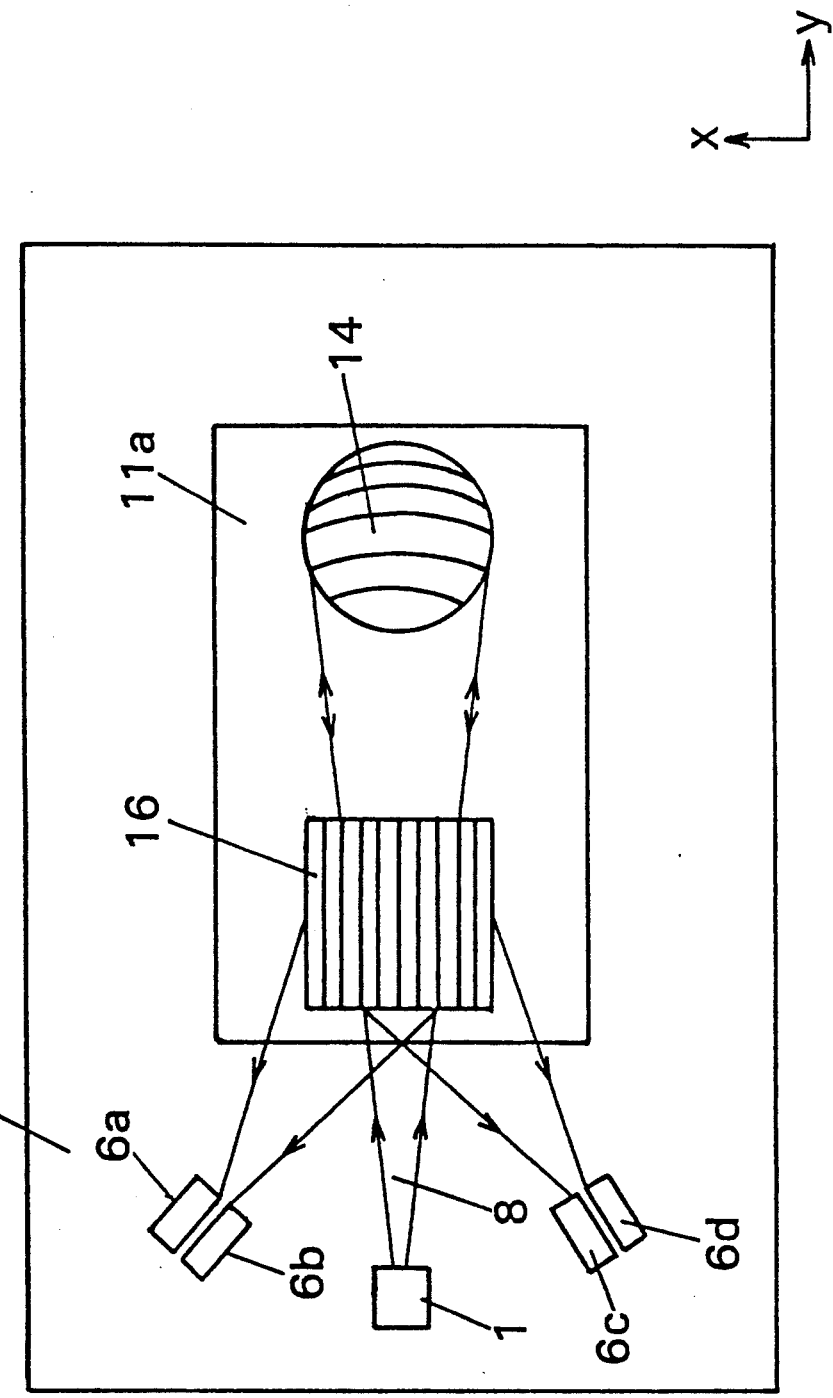
FIG. 14 is a plan view showing the arrangement of FIG. 13.

Referring to FIGS. 13 and 14, instead of using the reflex collimator 3 and the reflex beam splitter 15 having a curved grating, a reflex beam splitter 16 having a linear grating is employed. The linear grating includes a plurality of lines in parallel with the direction in which the light beam is propagated. A pair of detecting sections 6a and 6b are located on one side of the light source 1, and another pair of detecting sections 6c and 6d are located on the other side thereof. The other structure is the same as that of Example 6.

EXAMPLE 9

Figure 15:
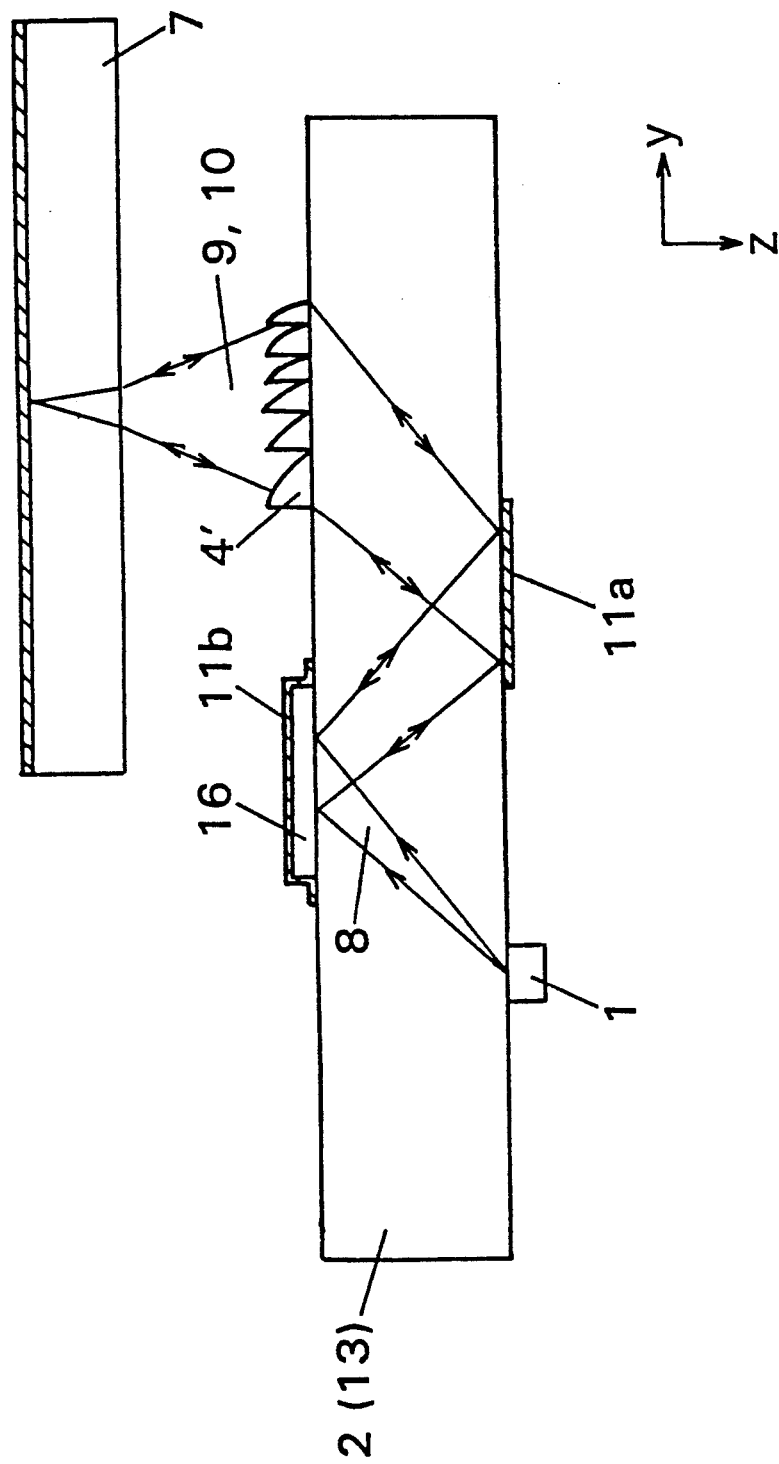
FIG. 15 is a cross-sectional view showing a structure of a ninth example version of the optical head according to the present invention, particularly to show the propagation and focusing of light beam.

Referring to FIG. 15, the light source 1 is disposed on the bottom surface of the substrate 2, and a reflex beam splitter 16 having a linear grating is disposed on the top surface of the substrate 2. The bottom surface of the substrate 2 is covered with a reflection layer 11a from which the light beam is reflected and led to an off-axis transmission condenser lens 4' which is disposed on the top surface of the substrate 2. The light beam is projected perpendicularly to the substrate 2 from the transmission condenser lens 4' and reflected therefrom. The reflected light beam is led into the zigzag path 13, and split into two parts which irradiate the respective pairs of detecting sections 6a and 6b, and 6c and 6d.

This example is advantageous in that the optical disk head is reduced in size, and simplified in structure.

EXAMPLE 10

Figure 16:
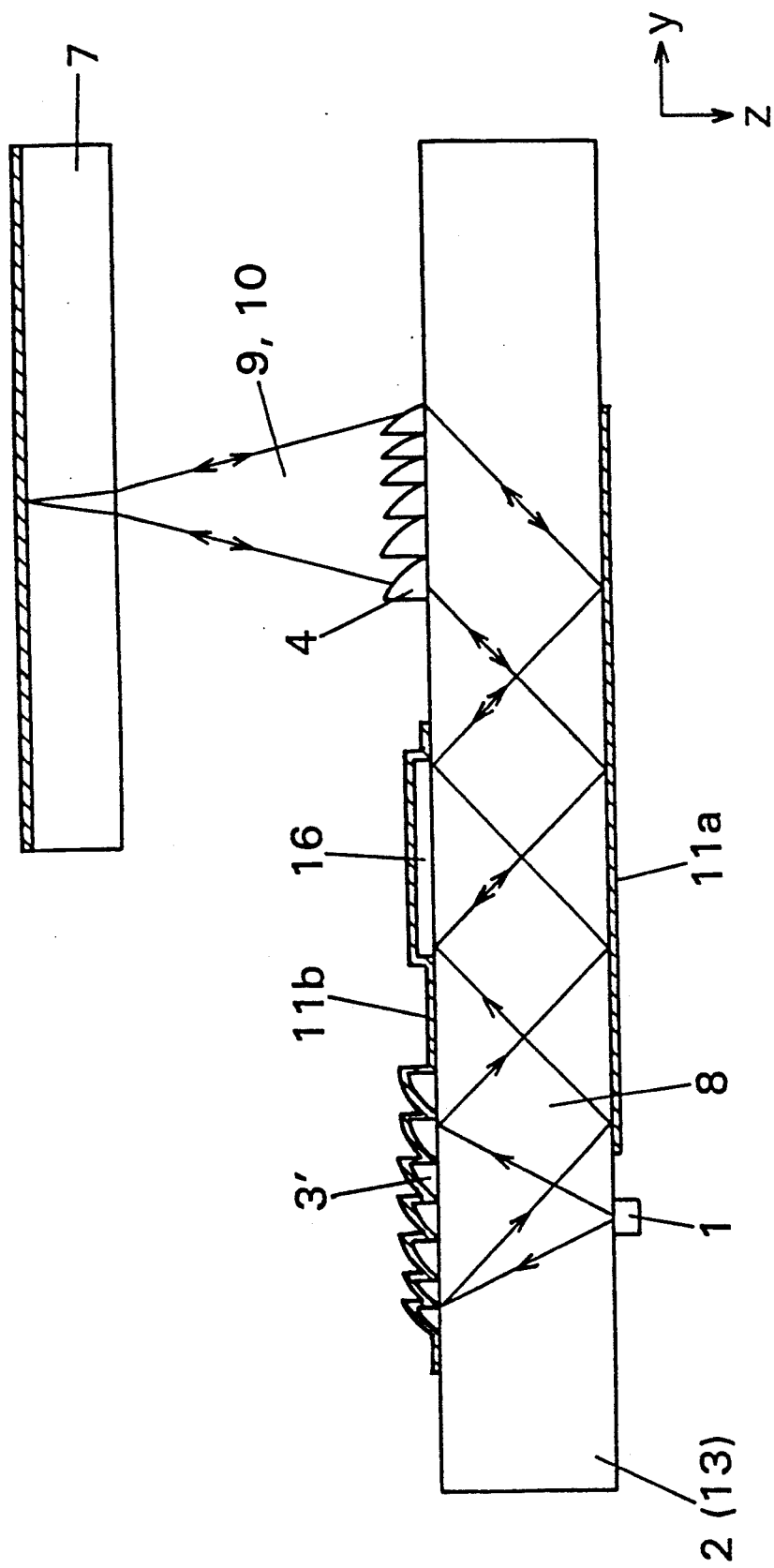
FIG. 16 is a cross-sectional view showing a structure of a tenth example of the optical head according to the present invention, particularly to show the propagation and focusing of light beam.
Figure 17:
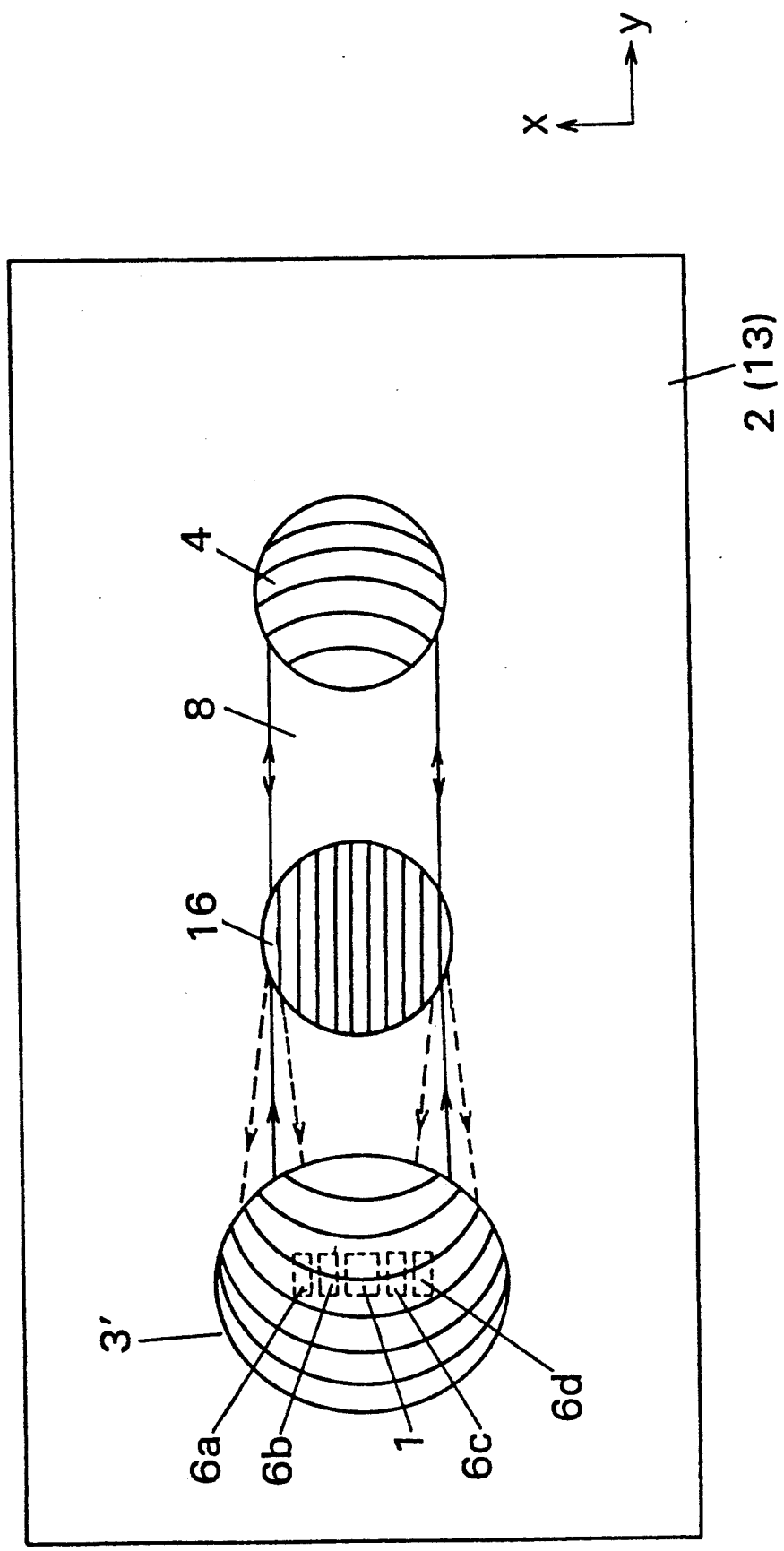
FIG. 17 is a plan view showing the arrangement of FIG. 16.

Referring to FIGS. 16 and 17, the light source 1 is positioned right below the off-axis reflex collimator 3'. Adjacent to the collimator 3' is disposed the reflex beam splitter 16. This example is different from Example 9 in that the light source 1 emits a laser beam perpendicularly to the substrate 2. The pairs of detecting sections 6a and 6b, and 6c and 6d are linearly disposed at right angle to the light source 1 and the direction in which the light beam is propagated. The other structure Is the same as that of Example 9.

The optical disk head of this example is advantageous in that the detecting sections 6a and 6b, and 6c and 6d can be easily aligned because of their positions at right angles to the light source 1. In addition, since the reflective collimator 3' and the transmission condenser lens 4 are an off-axis type, changes in the diffractive angle due to changes in wavelength can be mutually cancelled, thereby preventing the deterioration of optical characteristics.

EXAMPLE 11

Figure 18:
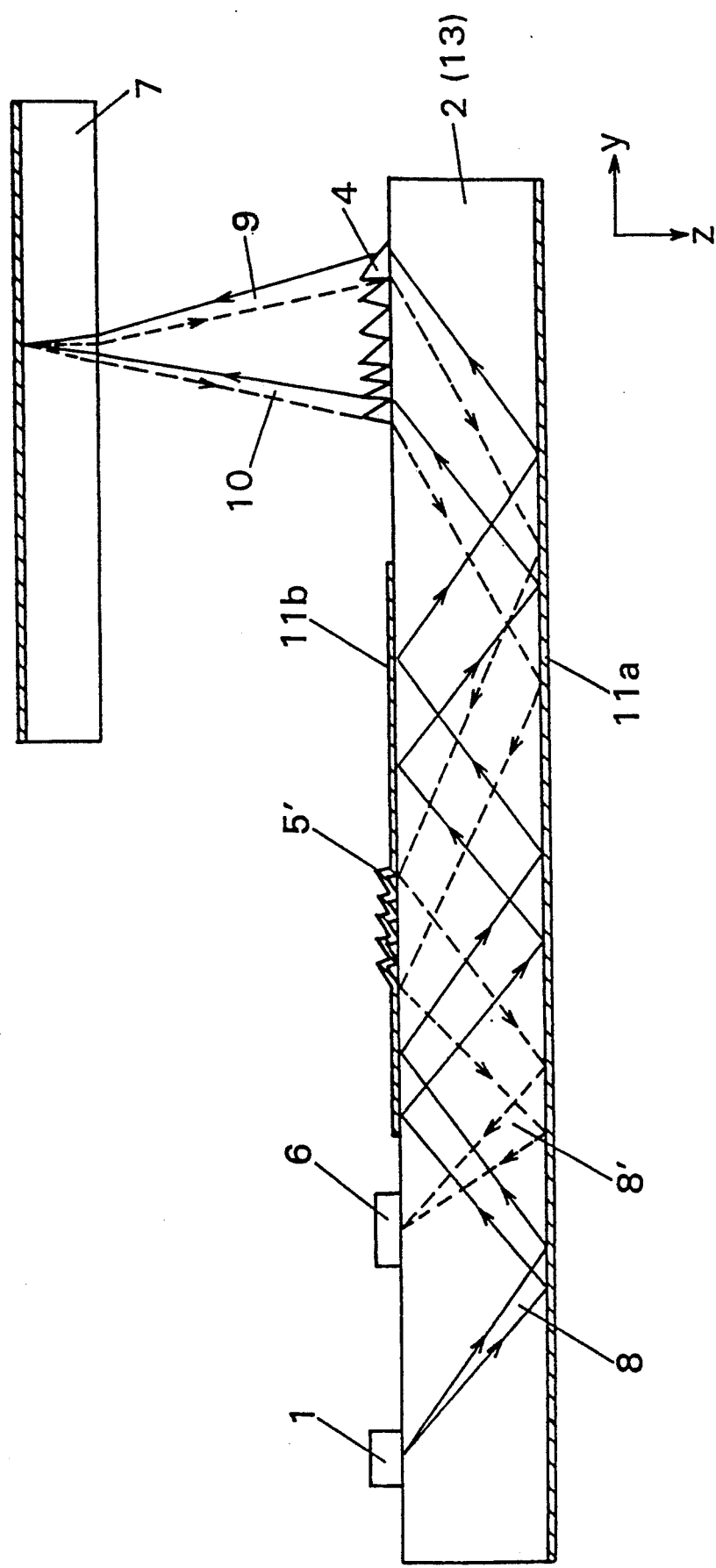
FIG. 18 is a cross-sectional view showing a structure of an eleventh example of the optical head according to the present invention, particularly to show the propagation and focusing of light beam.
Figure 19:
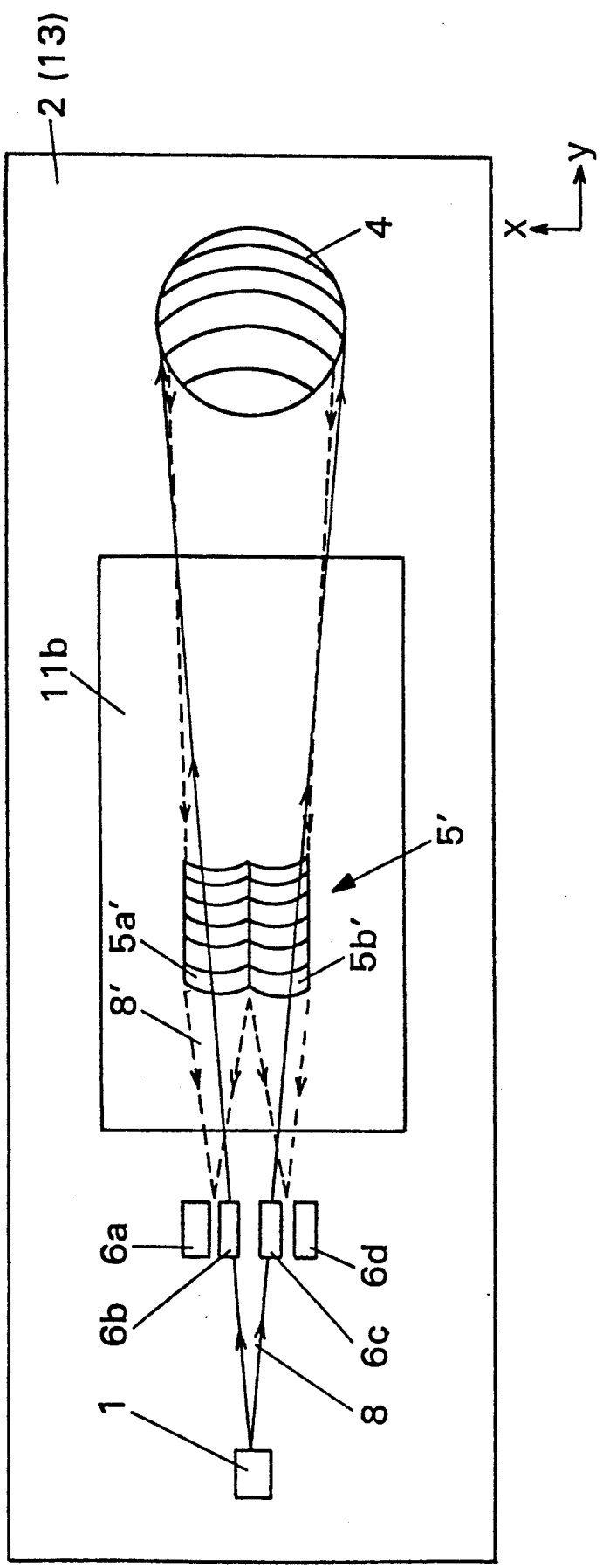
FIG. 19 is a plan view showing the arrangement of FIG. 18.

Referring to FIGS. 18 and 19, the transmission condenser lens 4 has an angle of exit of 3° or so with respect to the substrate 2, and the light source 1 is disposed on the top surface of the substrate 2. The light beam which is projected upon the optical disk 7 and reflected therefrom are introduced into the zigzag path 13 through the transmission condenser lens 4. The light beam follow a different path 8' (indicated by the dotted lines) from the path 8 (indicated by the solid line) and are propagated through the zigzag path 13 in the −y direction. The reflex beam splitter 5' is located at a position where the light beam emitted from the light source 1 are not allowed to enter but the light beam reflected from the optical disk 7 are allowed to enter. The advantage of this example is that the optical disk head can be reduced in size, and the loss of light is minimized. In addition, the crosstalk within the zigzag path 13 is reduced, thereby increasing the SN ratio.

EXAMPLE 12

Figure 20:
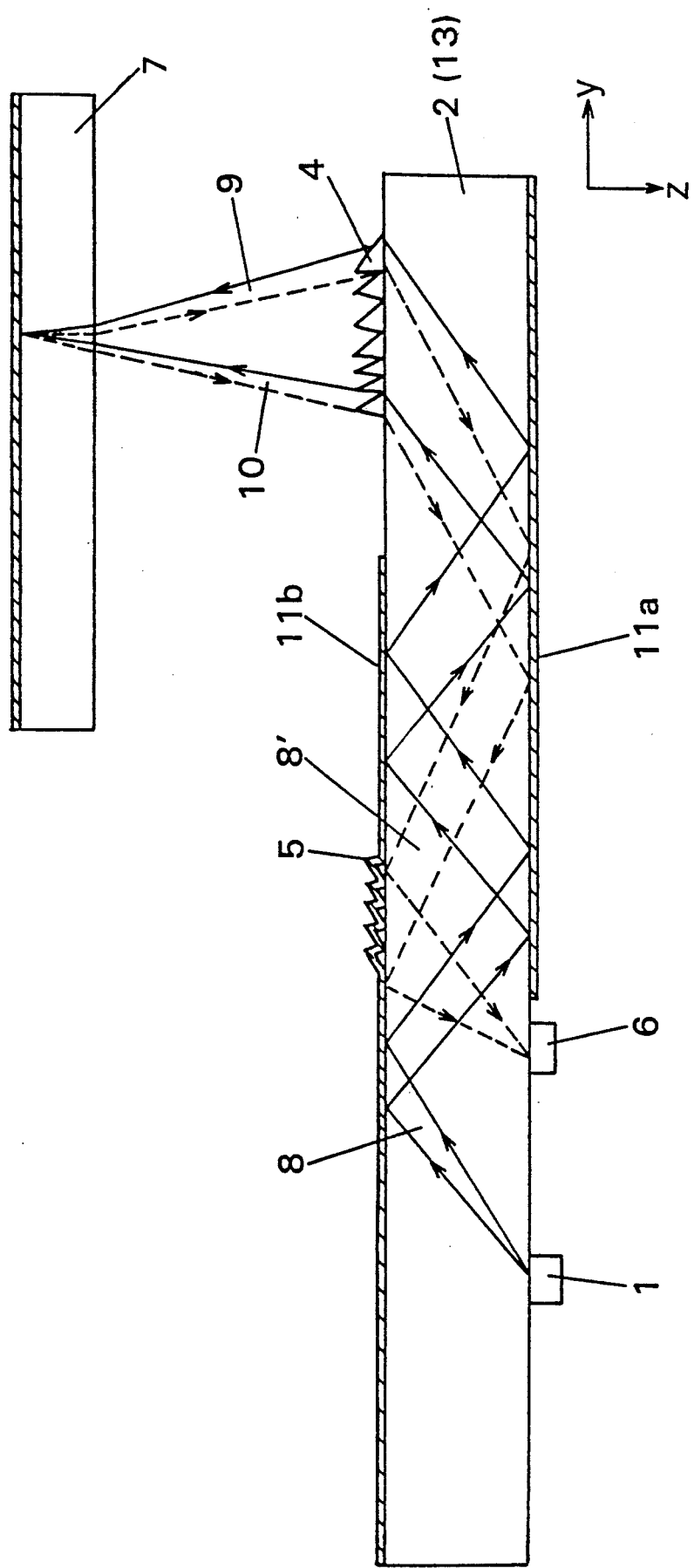
FIG. 20 is a cross-sectional view showing a structure of a twelfth example of the optical head according to the present invention, particularly to show the propagation and focusing of light beam.

Referring to FIG. 20, the light source 1 and the optical detector 6 are disposed on the bottom surface of the substrate 2 unlike Example 11. The provision of them on the bottom surface of the substrate 2 prevents them from coming into contact with the optical disk 7, thereby securing a space around the substrate 2. The small intervals among the light source 1, the optical detector 6, and the electric control circuit facilitate the electric wiring.

EXAMPLE 13

Figure 21:
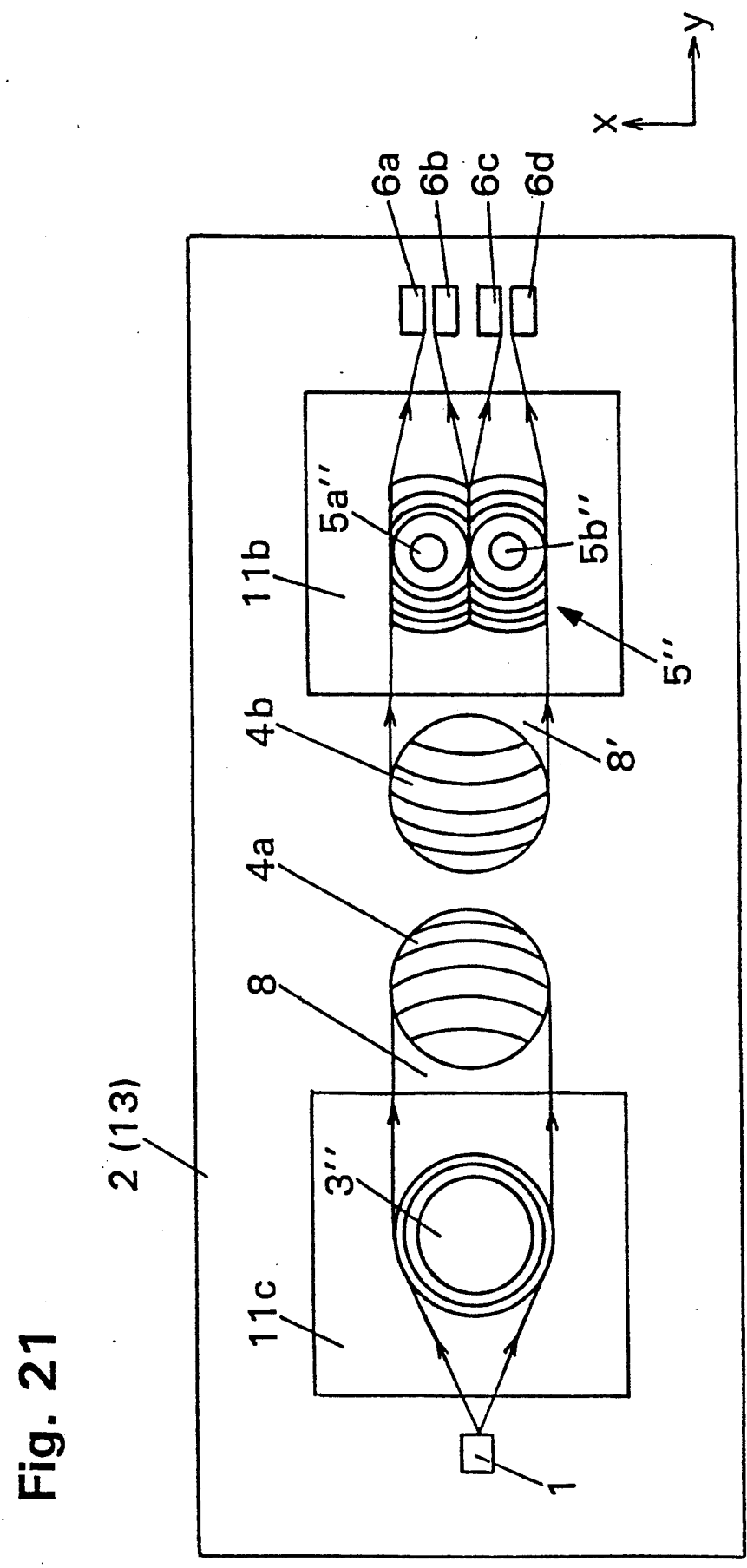
FIG. 21 is a cross-sectional view showing a structure of a thirteenth example of the optical head according to the present invention, particularly to show the propagation and focusing of light beam.
Figure 13:
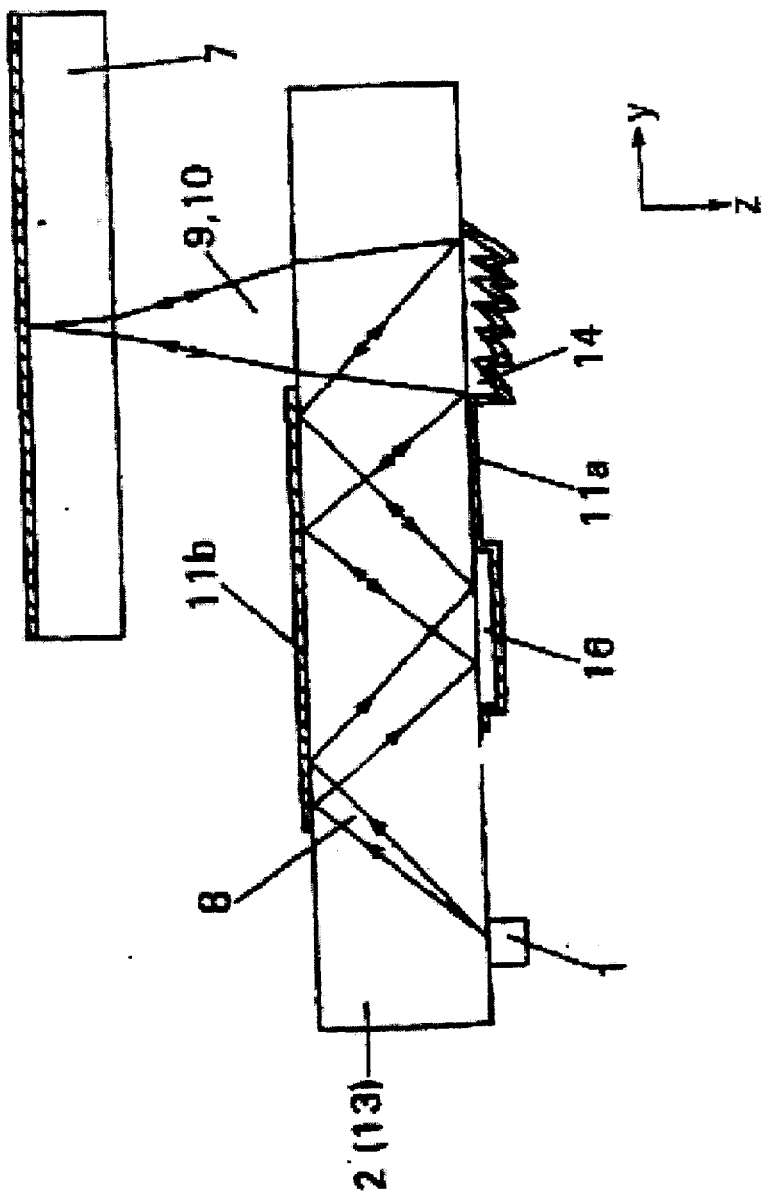

Referring to FIG. 21, instead of the reflex collimator 5 of Example 1 a reflex micro-Fresnel lens 3" is used, and instead of the reflex beam splitter, a beam splitter 5" including a pair of reflex micro-Fresnel lens 5a" and 5b" are used. The other structure is the same as that of Example 1. The micro-Fresnel lenses 3", 5a" and 5b" include a plurality of concentric curved gratings, thereby facilitating the fabrication of the optical disk 7.

Throughout the examples the light beam is propagated within the zigzag path by covering the substrate with a reflex covering but it is possible to provide the path on the substrate. When the angle of propagation is larger than the critical angle proper to the path, it is not required to provide the reflection layer.

The application of the present invention is not limited to an optical disk system but it can be applied to other optical recording apparatus using an optical recording medium.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical disk head comprising a substrate, a light path for allowing light beam to propagate in a zigzag form, having a thickness and width of at least 10 times greater than the wavelength, a light source optically connected to the light path so as to allow an incident light from the light source to propagate therethrough, a first light condensing means optically connected to the light path so as to radiate the light beam propagated through the light path upon an optical recording medium provided over a top surface of the substrate, a second light condensing means for guiding the light beam reflected from the optical recording medium into the light path, and an optical detector for detecting the light beam propagated through the light path guided by the second light condensing means, the first light condensing means being a diffractive optical component having a curved grating which comprises a plurality of curves which are bulged in the direction in which the light beam from the light source are propagated and symmetrical with respect to the center line of the propagating light beam.

2. An optical disk head according to claim 1, wherein the thickness and width of the light path is not smaller than 100 times the wavelength of the light beam propagated through the light path.

3. An optical disk head according to claim 1, further comprising a position detecting optical means.

4. An optical disk head according to claim 1, wherein the light path is disposed within the substrate.

5. An optical disk head comprising a substrate, a light path for allowing light beam to propagate in a zigzag form, having a thickness and width of at least 10 times greater than the wavelength, a light source optically connected to the light path so as to allow an incident light from the light source to propagate therethrough, a first light condensing means optically connected to the light path so as to radiate the light beam propagated through the light path upon an optical recording medium provided over a top surface of the substrate, a second light condensing means for guiding the light beam reflected from the optical recording medium into the light path, and an optical detector for detecting the light beam propagated through the light path guided by the second light condensing means, the second light condensing means being a diffractive optical component having a grating which comprises a plurality of curves which are bulged in the opposite direction to the direction in which the light beam introduced into the light path by the second light condensing means are propagated and symmetrical with respect to the center line of the propagating light beam.

6. An optical disk head according to claim 3, wherein the position detecting optical means is an optical beam splitter.

7. An optical disk head comprising a substrate, a light path for allowing light beam to propagate in a zigzag form, having a thickness and width of at least 10 times greater than the wavelength, a light source optically connected to the light path so as to allow an incident light from the light source to propagate therethrough, a first light condensing means optically connected to the light path so as to radiate the light beam propagated through the light path upon an optical recording medium provided over a top surface of the substrate, a second light condensing means for guiding the light beam reflected from the optical recording medium into the light path, an optical detector for detecting the light beam propagated through the light path guided by the second light condensing means, and a position detecting optical means comprising an optical beam splitter, the optical beam splitter being a reflex diffractive optical component disposed on the top surface of the substrate so as to face the optical recording medium, and including a pair of lenses, the pattern of each grating comprising a group of ellipses having equal eccentric ratios and major axes in the direction in which the light beam is propagated, wherein the centers of the ellipses are shifted one after another progressively in the opposite direction to the direction in which the light beam is propagated and the grating period diminishing toward the outside peripheries.

8. An optical disk head comprising a substrate, a light path for allowing light beam to propagate in a zigzag form, having a thickness and width of at least 10 times greater than the wavelength, a light source optically connected to the light path so as to allow an incident light from the light source to propagate therethrough, a first light condensing means optically connected to the light path so as to radiate the light beam propagated through the light path upon an optical recording medium provided over a top surface of the substrate, a second light condensing means for guiding the light beam reflected from the optical recording medium into the light path, an optical detector for detecting the light beam propagated through the light path guided by the second light condensing means, and a position detecting optical means comprising an optical beam splitter, the optical beam splitter comprising a pair of reflex micro-Fresnel lenses disposed on the top surface of the substrate.

9. An optical disk head according to claim 1, wherein the light path comprises a collimator for collimating the light beam propagated through the light path from the light source.

10. An optical disk head according to claim 9, wherein the collimator is a reflex diffractive optical component.

11. An optical disk head comprising a substrate, a light path for allowing light beam to propagate in a zigzag form, having a thickness and width of at least 10 times greater than the wavelength, a light source optically connected to the light path so as to allow an incident light from the light source to propagate therethrough, a first light condensing means optically connected to the light path so as to radiate the light beam propagated through the light path upon an optical recording medium provided over a top surface of the substrate, a second light condensing means for guiding the light beam reflected from the optical recording medium into the light path, and an optical detector for detecting the light beam propagated through the light path guided by the second light condensing means, the light path comprises a collimator for collimating the light beam propagated through the light path from the light source, the collimator being a reflex diffractive optical component, the collimator comprising gratings which include a plurality of ellipses having major axes in the direction in which the light beam is propagated, wherein the centers of the curves are shifted one after another progressively in the direction in which the light beam is propagated.

12. An optical disk head according to claim 9, wherein the collimator in a micro-Fresnel lens.

13. An optical disk head according to claim 10, wherein the first and second light condensing means are transmission off-axis lenses disposed on the top surface of the substrate so as to face on the optical recording medium, and wherein the beam splitter and the collimator are disposed on the top surface of the substrate.

14. An optical disk head according to claim 1, wherein the light source and the optical detector are disposed on the top surface of the substrate so as to face the optical recording medium.

15. An optical disk head according to claim 13, wherein the light source and the optical detector are disposed on the bottom surface of the substrate.

16. An optical disk head according to claim 15, wherein the light source and the collimator are disposed in correspondence to each other with the substrate being interposed, and wherein the optical detector and the optical beam splitter are disposed in correspondence to each other with the substrate being interposed.

17. An optical disk head according to claim 1, wherein the first and second light condensing means are reflex off-axis lenses, and disposed on the bottom surface of the substrate.

18. An optical disk head according to claim 1, wherein the second light condensing means is a transmission diffractive beam splitter, and disposed on the top surface of the substrate, and the split light beam is detected by the optical detector.

19. An optical disk head comprising a substrate, a light path for allowing light beam to propagate in a zigzag form, having a thickness and width of at least 10 times greater than the wavelength, a light source optically connected to the light path so as to allow an incident light from the light source to propagate therethrough, a first light condensing means optically connected to the light path so as to radiate the light beam propagated through the light path upon an optical recording medium provided over a top surface of the substrate, a second light condensing means for guiding the light beam reflected from the optical recording medium into the light path, and an optical detector for detecting the light beam propagated through the light path guided by the second light condensing means, the second light condensing means being a transmission diffractive beam splitter disposed on the top surface of the substrate, the split light beam being detected by the optical detector, the second light condensing means comprising a pair of gratings which includes a plurality of curves bulged in the opposite direction to the direction in which the light beam introduced by the second light condensing means into the light path are propagated therethrough, the curved being symmetrical with respect to the center line of the propagating light beam.

20. An optical disk head according to claim 19, wherein the light source and the optical detector are disposed on the top surface of the substrate.

21. An optical disk head comprising a substrate, a light path for allowing light beam to propagate in a zigzag form, having a thickness and width of at least 10 times greater than the wavelength, a light source optically connected to the light path so as to allow an incident light from the light source to propagate therethrough, a light condensing means optically connected to the light path so as to radiate the light beam propagated through the light path upon an optical recording medium provided over a top surface of the substrate and for guiding the light beam reflected from the optical recording medium into the light path, and an optical detector for detecting the light beam propagated through the light path guided by the light condensing means, the light condensing means being a diffractive optical component having a grating, the grating comprising a plurality of curves bulged in the direction in which the light beam from the light source is propagated, the grating being symmetrical with respect to the center line of the propagating light beam.

22. An optical disk head according to claim 21, wherein the thickness and width of the light path are at least 100 times greater than the wavelength of the light beam propagated through the light path.

23. An optical disk head according to claim 21, further comprising a position detecting optical means.

24. An optical disk head according to claim 21, wherein the light path is disposed within the substrate.

25. An optical disk head according to claim 23, wherein the position detecting optical means is an optical beam splitter.

26. An optical disk head according to claim 25, wherein the optical beam splitter is a reflex diffractive optical component for diffracting the light beam introduced by the light condensing means into the light path and propagated therethrough so as to direct the light beam sideways of the direction of propagation.

27. An optical disk head according to claim 21, wherein the light condensing means is a reflective type, and posed on the bottom surface of the substrate.

28. An optical disk head according to claim 27, wherein the optical beam splitter, the light source, and the optical detector are disposed on the bottom surface of the substrate.

29. An optical disk head comprising a substrate, a light path for allowing light beam to propagate in a zigzag form, having a thickness and width of at least 10 times greater than the wavelength, a light source optically connected to the light path so as to allow an incident light from the light source to propagate therethrough, a light condensing means optically connected to the light path so as to radiate the light beam propagated through the light path upon an optical recording medium provided over a top surface of the substrate and for guiding the light beam reflected from the optical recording medium into the light path, an optical detector for detecting the light beam propagated through the light path guided by the light condensing means, and a position detecting optical means comprising an optical beam splitter, the beam splitter comprising a pair of curved gratings which are arranged perpendicularly to the direction in which the light beam is propagated, and are symmetrical to each other.

30. An optical disk head according to claim 29, further comprising a reflex collimator disposed on the bottom surface of the substrate, so as to collimate the light beam radiated from the light source and propagated through the light path.

31. An optical disk head according to claim 30, wherein the collimator is a reflex diffractive optical component and comprises curved grating which includes a plurality of ellipses having major axes in the direction in which the light beam is propagated, wherein the canters of the elliptical curves are shifted one after another progressively in the direction in which the light beam from the light source are propagated.

32. An optical disk head comprising a substrate, a light path for allowing light beam to propagate in a zigzag form, having a thickness and width of at least 10 times greater than the wavelength, a light source optically connected to the light path so as to allow an incident light from the light source to propagate therethrough, a light condensing means optically connected to the light path so as to radiate the light beam propagated through the light path upon an optical recording medium provided over a top surface of the substrate and for guiding the light beam reflected from the optical recording medium into the light path, an optical detector for detecting the light beam propagated through the light path guided by the light condensing means, and a position detecting optical means comprising an optical beam splitter, the beam splitter comprising a linear grating including a plurality of linear lines.

33. An optical disk head according to claim 26, wherein the light condensing means is a transmission type, and is disposed on the top surface of the substrate so as to radiate the light beam perpendicularly to the substrate.

34. An optical disk head according to claim 33, wherein the beam splitter is disposed on the top surface of the substrate, and the optical detector and the light source are disposed on the bottom surface thereof.

35. An optical disk head comprising a substrate, a light path for allowing light beam to propagate in a zigzag form, having a thickness and width of at least 10 times greater than the wavelength, a light source optically connected to the light path so as to allow an incident light from the light source to propagate therethrough, a light condensing means optically connected to the light path so as to radiate the light beam propagated through the light path upon an optical recording medium provided over a top surface of the substrate and for guiding the light beam reflected from the optical recording medium into the light path, an optical detector for detecting the light beam propagated through the light path guided by the light condensing means, and a position detecting optical means comprising an optical beam splitter, the optical beam splitter being a reflex diffractive optical component for diffracting the light beam introduced by the light condensing means into the light path and propagated therethrough so as to direct the light beam sideways of the direction of propagation, the light condensing means being a transmission type, and being disposed on the top surface of the substrate so as to radiate the light beam perpendicularly to the substrate, the beam splitter being disposed on the top surface of the substrate, and the optical detector and the light source being disposed on the bottom surface thereof, the beam splitter comprising a pair of curved gratings arranged laterally with respect to the light beam, and symmetrical to each other with respect to the light propagating direction.

36. An optical disk head according to claim 35, wherein the substrate is provided with a reflex collimator for collimating the light beam output from the light source and propagated through the light path.

37. An optical disk head according to claim 36, wherein the collimator is a diffractive optical component, and includes a plurality of elliptical curves having major axes in the direction in which the light beam is propagated, wherein the canters of the elliptical curves are shifted one after another progressively in the direction in which the light beam from the light source is propagated.

38. An optical disk head comprising a substrate, a light path for allowing light beam to propagate in a zigzag form, having a thickness and width of at least 10 times greater than the wavelength, a light source optically connected to the light path so as to allow an incident light from the light source to propagate therethrough, a light condensing means optically connected to the light path so as to radiate the light beam propagated through the light path upon an optical recording medium provided over a top surface of the substrate and for guiding the light beam reflected from the optical recording medium into the light path, an optical detector for detecting the light beam propagated through the light path guided by the light condensing means, and a position detecting optical means comprising an optical beam splitter, the optical beam splitter being a reflex diffractive optical component for diffracting the light beam introduced by the light condensing means into the light path and propagated therethrough so as to direct the light beam sideways of the direction of propagation, the light condensing means being a transmission type, and being disposed on the top surface of the substrate so as to radiate the light beam perpendicularly to the substrate, the beam splitter being disposed on the top surface of the substrate, and the optical detector and the light source being disposed on the bottom surface thereof, the beam splitter comprising a linear grating including a plurality of linear lines.

39. An optical disk head according to claim 38, wherein the substrate is provided with a reflex collimator for collimating the light beam from the light source and propagated through the light path.

40. An optical disk head according to claim 39, wherein the collimator is a diffractive type, and comprises a curved grating which includes a plurality of elliptical curves having major axes in the direction in which the light beam is propagated, wherein the centers of the elliptical curves are shifted one after another progressively in the direction in which the light beam from the light source in propagated.

41. An optical disk head according to claim 26, wherein the light condensing means is@a transmission type, and disposed on the top surface f the substrate so as to radiate the light beam from the light source obliquely to the substrate.

42. An optical disk head comprising a substrate, a light path for allowing light beam to propagate in a zigzag form, having a thickness and width of at least 10 times greater than the wavelength, a light source optically connected to the light path so as to allow an incident light from the light source to propagate therethrough, a light condensing means optically connected to the light path so as to radiate the light beam propagated through the light path upon an optical recording medium provided over a top surface of the substrate and for guiding the light beam reflected from the optical recording medium into the light path, an optical detector for detecting the light beam propagated through the light path guided by the light condensing means, and a position detecting optical means comprising an optical beam splitter, the optical beam splitter being a reflex diffractive optical component for diffracting the light beam introduced by the light condensing means into the light path and propagated therethrough so as to direct the light beam sideways of the direction of propagation, the light condensing means being a transmission type, and being disposed on the top surface of the substrate so as to radiate the light beam from the light source obliquely to the substrate, the beam splitter comprising a pair of curved gratings arranged laterally with respect to the light beam, and are symmetrical to each other with respect to the light propagating direction.

43. An optical disk head according to claim 42, wherein the beam splitter, the optical detector, and the light source are disposed on the top surface of the substrate.

44. An optical disk head according to claim 42, wherein the beam splitter is disposed on the top surface of the substrate, and the optical detector and the light source are disposed on the bottom surface of the substrate.

* * * * *

UNITED STATES PATENT AND TRADEMARK OFFICE
CERTIFICATE OF CORRECTION

PATENT NO. : 5,317,551  
DATED : May 31, 1994  
INVENTOR(S) : Teruhiro Shiono

It is certified that error appears in the above-indentified patent and that said Letters Patent is hereby corrected as shown below:

Col. 5, line 29, replace "ia" with --a--.

Col. 8, line 32, replace "$n^2$" with --$n'^2$--; Col. 8, lines 41-42, replace "1-/cos$\theta$" with --1/cos$\theta$--.

Col. 9, line 3, replace "$\theta_1$" with --$\Phi_1$--; Col. 9, line 15, replace "(0, -[n'sin$\theta$(m$\lambda$+f$_1$)-f$_1$sin$\theta_1$/(1-n'$^2$sin$^2$))" with --(0, -[n'sin$\theta$(m$\lambda$+f$_1$)-f$_1$sin$\theta_1$]/(1-n'$^2$sin$^2\theta$))--; Col. 9, line 18, replace "2a$\sqrt{1-n'^2\sin\theta}$" with --2a$\sqrt{1-n'^2\sin\theta}$-- ;

UNITED STATES PATENT AND TRADEMARK OFFICE
CERTIFICATE OF CORRECTION

PATENT NO. : 5,317,551
DATED : May 31, 1994
INVENTOR(S) : Teruhiro Shiono

It is certified that error appears in the above-indentified patent and that said Letters Patent is hereby corrected as shown below:

Claim 11, Col. 17, line 21, replace "comprises" with --comprising--.

Claim 41, Col. 21, line 2, replace "is@a" with --is a--.

Claim 41, Col. 21, line 3, replace "surface f" with --surface of--.

In the Drawings:

Figure 6, sheet 6 of 21, insert reference number "6c" as shown on attached sheet.

Figure 13, the reflection layer (11a) should extend over the condenser lens (14) as shown on the attached sheet.

Signed and Sealed this

Second Day of May, 1995

Attest:

BRUCE LEHMAN

*Attesting Officer*   *Commissioner of Patents and Trademarks*

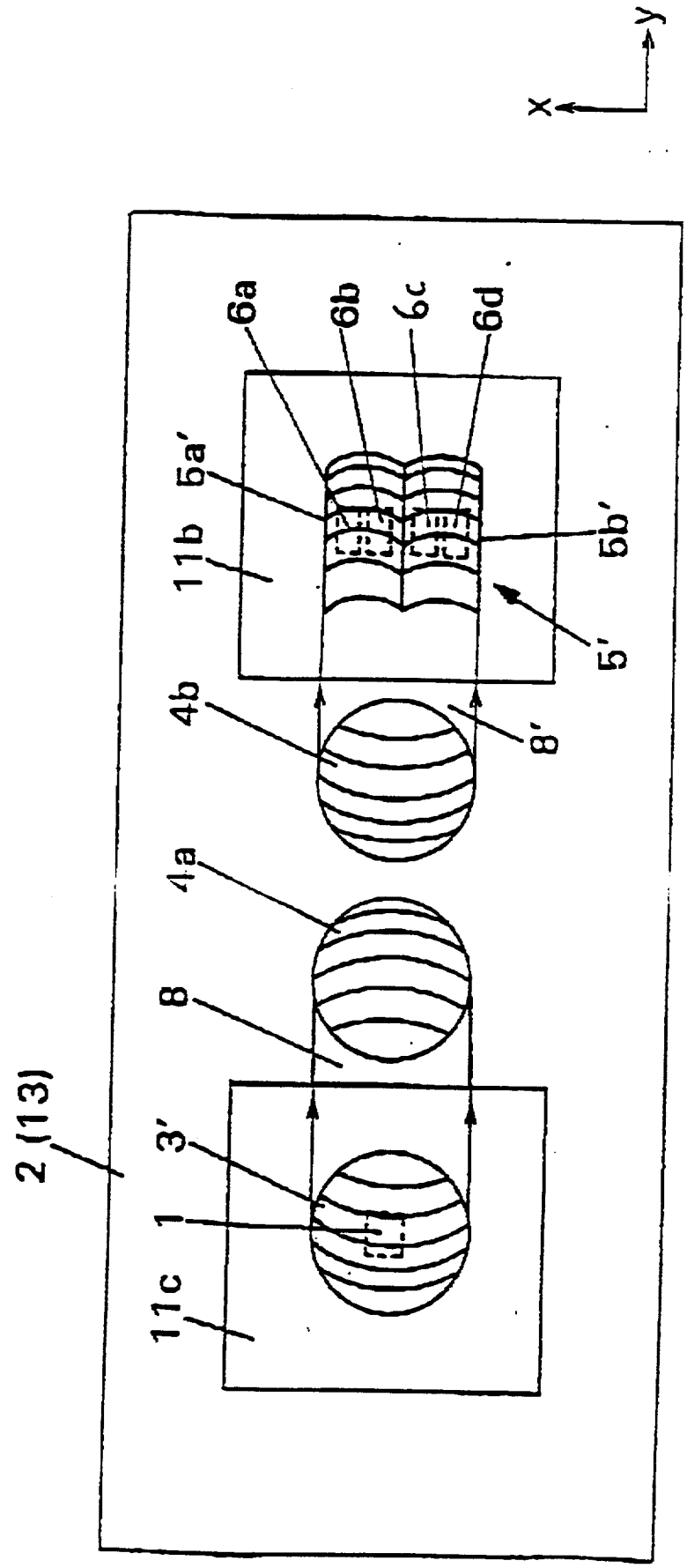

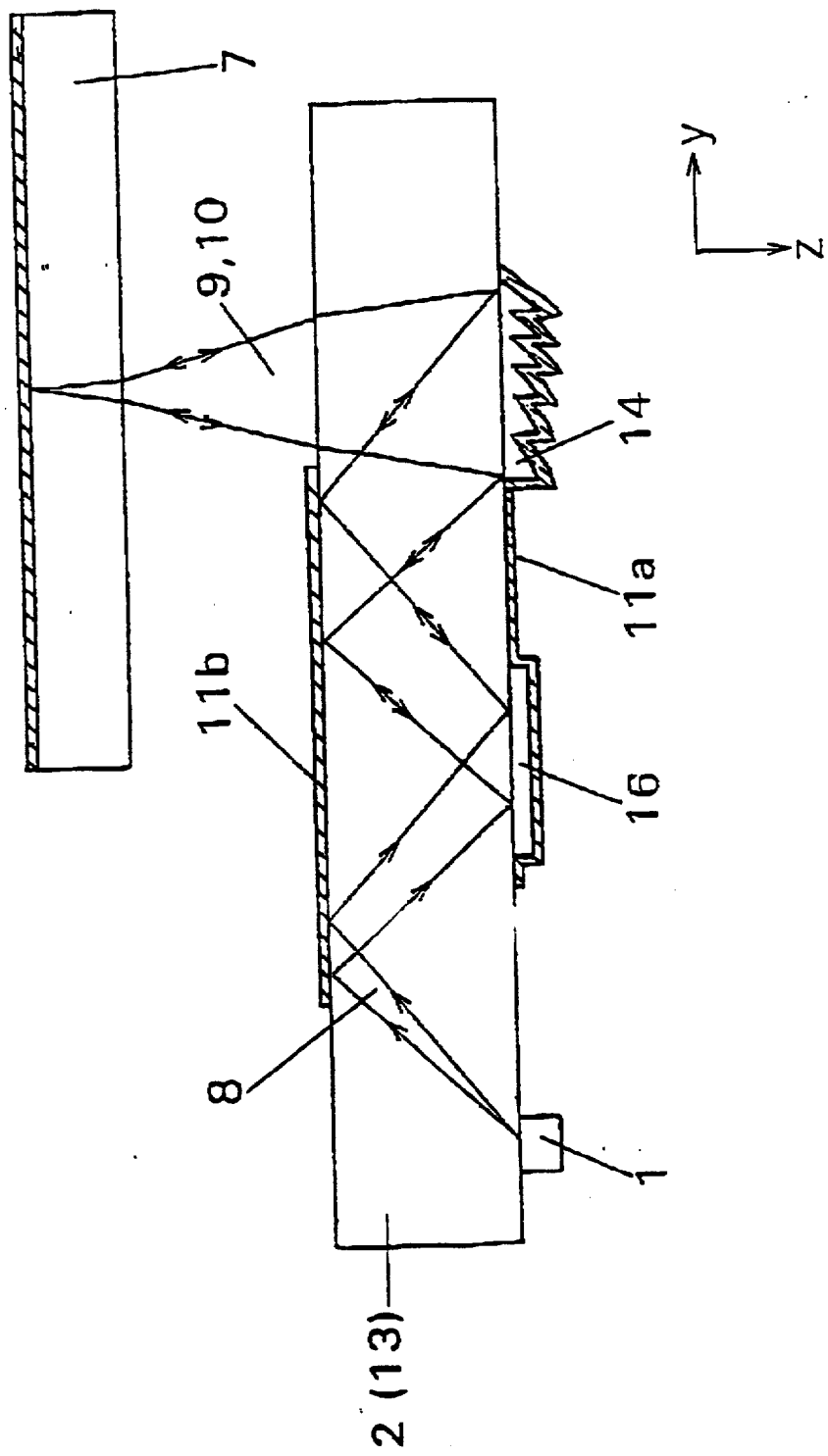

UNITED STATES PATENT AND TRADEMARK OFFICE
CERTIFICATE OF CORRECTION

PATENT NO. : 5,317,551
DATED : May 31, 1994
INVENTOR(S) : Teruhiro Shiono

It is certified that error appears in the above-identified patent and that said Letters Patent is hereby corrected as shown below:

In the Drawings:

Figure 6, sheet 6 of 21, insert reference number "6c" as shown on attached sheet.

This certificate supersedes the Certificate of Correction issued on May 2, 1995.

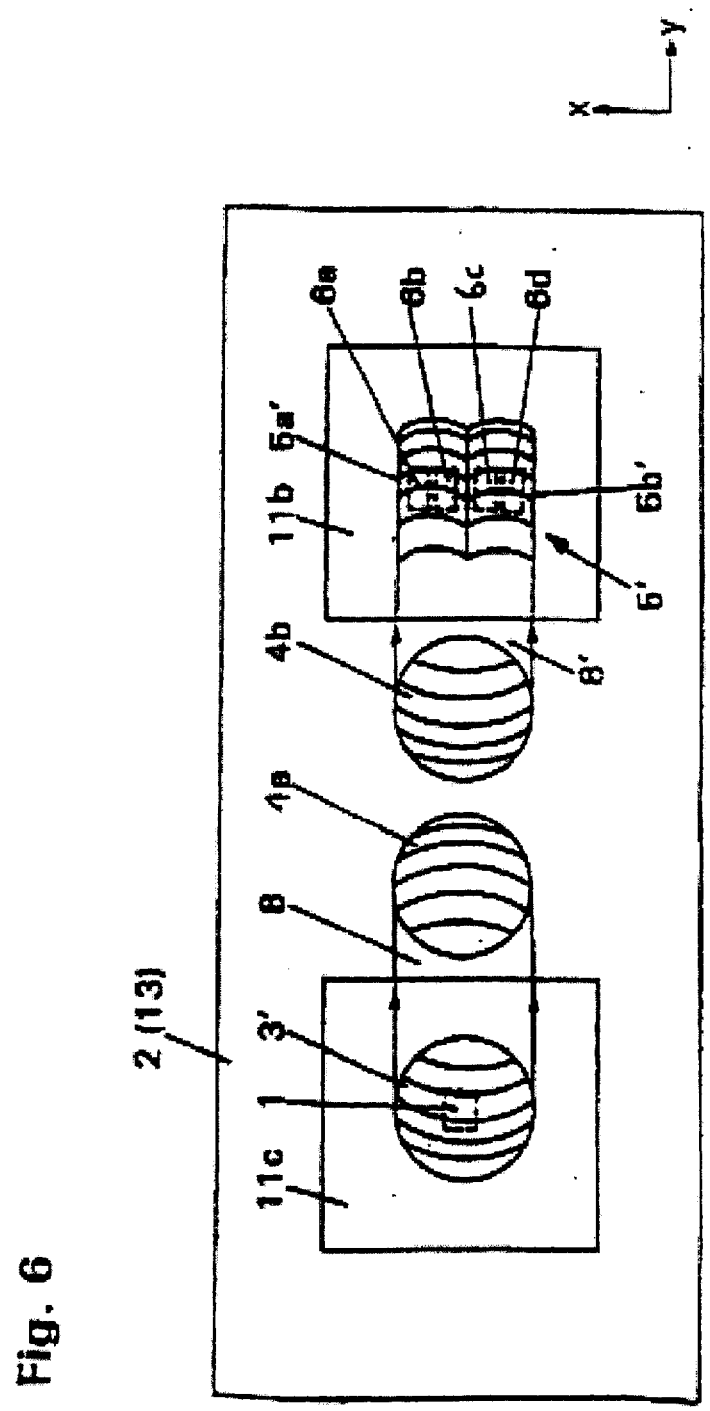

UNITED STATES PATENT AND TRADEMARK OFFICE
CERTIFICATE OF CORRECTION

PATENT NO. : 5,317,551
DATED : May 31, 1994
INVENTOR(S) : Teruhiro Shiono

It is certified that error appears in the above-identified patent and that said Letters Patent is hereby corrected as shown below:

Figure 13, the reflection layer (11a) should extend over the condenser lens (14) as shown on the attached sheet.

UNITED STATES PATENT AND TRADEMARK OFFICE
CERTIFICATE OF CORRECTION

PATENT NO.   : 5,317,551
DATED        : May 31, 1994
INVENTOR(S)  : Teruhiro Shiono It is certified that error appears in the above-identified patent and that said Letters Patent is hereby corrected as shown below:

<u>Column 5,</u>
Line 29, replace "ia" with --a--.

<u>Column 8,</u>
Line 32, replace "$n'^2$" with --$n^{2'}$--;

<u>Column 8,</u>
Lines 41 - 42, replace "1 -/cosθ" with --1/cosθ--.

<u>Column 9,</u>
Line 3, replace "$\theta_1$" with --$\Phi_1$--;

<u>Column 9,</u>
Line 15, replace "$(0, -[n'\sin\theta (m\lambda + f_1) - f_1 \sin\theta 1/(1-n'^2 \sin^2))$" with
--$(0, -[n'\sin\theta (m\lambda+f_1)-f_1\sin\theta_1]/(1-n'^2\sin^2\theta))$--.

Signed and Sealed this

Twelfth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 5,317,551
DATED : May 31, 1994
INVENTOR(S) : Teruhiro Shiono

It is certified that error appears in the above-identified patent and that said Letters Patent is hereby corrected as shown below:

Column 9,
Line 18, replace "$2a\sqrt{1-n'^2\sin\theta}$" with -- $2a\sqrt{1-n'^2\sin\theta}$ --

Column 12,
Line 29, replace "lose" with --loss--.

Claim 11, Column 17
Line 21, replace "comprises" with --comprising--.

Claim 41, Column 21,
Line 2, replace is@a with --is a--.

Claim 41, Column 21,
Line 3, replace "surface f" with --surface of--.

Signed and Sealed this

Twelfth Day of June, 2001

*Attest:*

*Attesting Officer*

NICHOLAS P. GODICI
Acting Director of the United States Patent and Trademark Office